(12) United States Patent
Shoemake et al.

(10) Patent No.: US 9,253,520 B2
(45) Date of Patent: Feb. 2, 2016

(54) VIDEO CAPTURE, PROCESSING AND DISTRIBUTION SYSTEM

(71) Applicant: Biscotti Inc., McKinney, TX (US)

(72) Inventors: Matthew B. Shoemake, Allen, TX (US); Syed Nadeem Ahmed, Allen, TX (US); Craig D. Smith, Allen, TX (US); Jack R. Ring, Lewisville, TX (US)

(73) Assignee: Biscotti Inc., Plano, TX (US)

( * ) Notice: Subject to any disclaimer, the term of this patent is extended or adjusted under 35 U.S.C. 154(b) by 17 days.

(21) Appl. No.: 14/106,263

(22) Filed: Dec. 13, 2013

(65) Prior Publication Data

US 2014/0168453 A1 Jun. 19, 2014

Related U.S. Application Data

(60) Provisional application No. 61/877,928, filed on Sep. 13, 2013, provisional application No. 61/874,903, filed on Sep. 6, 2013, provisional application No. 61/872,603, filed on Aug. 30, 2013, provisional (Continued)

(51) Int. Cl.
*H04N 5/225* (2006.01)
*H04N 21/2743* (2011.01)
*H04N 5/232* (2006.01)
*H04N 21/422* (2011.01)

(Continued)

(52) U.S. Cl.
CPC ....... *H04N 21/2743* (2013.01); *H04N 5/23206* (2013.01); *H04N 21/4223* (2013.01); *H04N 21/42203* (2013.01); *H04N 21/44008* (2013.01)

(58) Field of Classification Search
CPC .................................................. H04N 1/00204

USPC ........... 348/47; 382/118; 715/38; 455/556.1; 709/203

See application file for complete search history.

(56) References Cited

U.S. PATENT DOCUMENTS 6,058,307 A 5/2000 Garner
6,614,465 B2 9/2003 Alexander et al.

(Continued)

FOREIGN PATENT DOCUMENTS

EP 1814290 A2 1/2007
JP 2010/152866 A 7/2010

(Continued)

OTHER PUBLICATIONS

AWS, Amazon Elastic Compute Cloud (EC2), Amazon Web Services LLC, 6 pages, Available at: http://aws.amazon.com/ec2/; Accessed on Mar. 3, 2014.

(Continued)

*Primary Examiner* — Roberto Velez
*Assistant Examiner* — Stephen Coleman
(74) *Attorney, Agent, or Firm* — Swanson & Bratschun, L.L.C.

(57) ABSTRACT

Novel tools and techniques for implementing remote control of image and video capture devices, and/or for implementing remote control of processing and sharing functions associated with captured image and/or video data. In accordance with some techniques, a first image capture device ("ICD") at a customer premises and/or another computer (such as a control server) can identify and/or authenticate a user. Once identified and/or authenticated, the user is provided options to remotely control one or more second ICDs over the network. The user may also be provided options for displaying, processing, creating time lapse videos of, or sharing captured image data or video data.

26 Claims, 6 Drawing Sheets

Related U.S. Application Data application No. 61/858,518, filed on Jul. 25, 2013, provisional application No. 61/759,621, filed on Feb. 1, 2013, provisional application No. 61/737,506, filed on Dec. 14, 2012.

(51) Int. Cl.
*H04N 21/4223* (2011.01)
*H04N 21/44* (2011.01)

(56) References Cited

U.S. PATENT DOCUMENTS

| | | | |
|---|---|---|---|
| 6,638,113 B2 | 10/2003 | Kajiwara et al. | |
| 6,804,224 B1 | 10/2004 | Schuster et al. | |
| 7,039,393 B1 | 5/2006 | Kite | |
| 7,084,904 B2 | 8/2006 | Liu et al. | |
| 7,587,289 B1 | 9/2009 | Sivertsen | |
| 7,646,404 B2 | 1/2010 | Liu et al. | |
| 7,768,388 B2 | 8/2010 | Putterman et al. | |
| 8,063,929 B2 | 11/2011 | Kurtz et al. | |
| 8,122,491 B2 | 2/2012 | Yee et al. | |
| 8,144,182 B2 | 3/2012 | Shoemake et al. | |
| 8,239,903 B1 | 8/2012 | Campagna et al. | |
| 8,300,082 B2 | 10/2012 | Malik | |
| 8,325,213 B2 | 12/2012 | Lamb et al. | |
| 8,330,795 B2 | 12/2012 | Iyer et al. | |
| 8,366,487 B2 | 2/2013 | Weng et al. | |
| 8,395,652 B1 | 3/2013 | Chapweske et al. | |
| 8,566,838 B2 | 10/2013 | Sabin et al. | |
| 8,914,837 B2 | 12/2014 | Ahmed et al. | |
| 2001/0001159 A1 | 5/2001 | Ford | |
| 2001/0032246 A1 | 10/2001 | Fardella et al. | |
| 2002/0059094 A1 | 5/2002 | Hosea et al. | |
| 2002/0073420 A1 | 6/2002 | Yoon | |
| 2002/0118675 A1 | 8/2002 | Strathmeyer et al. | |
| 2003/0160871 A1 | 8/2003 | Pelletier et al. | |
| 2003/0200105 A1 | 10/2003 | Borden, IV et al. | |
| 2004/0027624 A1* | 2/2004 | Parulski et al. | 358/527 |
| 2004/0061787 A1 | 4/2004 | Liu et al. | |
| 2004/0114919 A1 | 6/2004 | Rife | |
| 2004/0145658 A1 | 7/2004 | Lev-Ran et al. | |
| 2005/0007445 A1 | 1/2005 | Foote et al. | |
| 2005/0066357 A1 | 3/2005 | Ryal | |
| 2005/0086069 A1 | 4/2005 | Watson et al. | |
| 2005/0096084 A1* | 5/2005 | Pohja et al. | 455/556.1 |
| 2005/0195954 A1 | 9/2005 | Klein et al. | |
| 2005/0246738 A1 | 11/2005 | Lockett et al. | |
| 2005/0283813 A1 | 12/2005 | Jamail et al. | |
| 2006/0031291 A1* | 2/2006 | Beckemeyer | 709/204 |
| 2006/0107281 A1 | 5/2006 | Dunton | |
| 2006/0110136 A1 | 5/2006 | Abecassis | |
| 2006/0130118 A1 | 6/2006 | Damm | |
| 2006/0130119 A1 | 6/2006 | Candelore et al. | |
| 2006/0187306 A1 | 8/2006 | Matsui | |
| 2006/0209194 A1 | 9/2006 | Liu et al. | |
| 2006/0268149 A1 | 11/2006 | Teng | |
| 2007/0067407 A1 | 3/2007 | Bettis et al. | |
| 2007/0161386 A1 | 7/2007 | Faber et al. | |
| 2007/0188597 A1 | 8/2007 | Kenoyer | |
| 2007/0203708 A1 | 8/2007 | Polcyn et al. | |
| 2007/0204288 A1 | 8/2007 | Candelore | |
| 2007/0239825 A1 | 10/2007 | Walter | |
| 2007/0271580 A1 | 11/2007 | Tischer et al. | |
| 2008/0028318 A1 | 1/2008 | Shikuma | |
| 2008/0040380 A1 | 2/2008 | Miyaki | |
| 2008/0062253 A1 | 3/2008 | Jaspersohn et al. | |
| 2008/0152096 A1 | 6/2008 | Archer | |
| 2008/0189617 A1* | 8/2008 | Covell et al. | 715/738 |
| 2008/0201369 A1 | 8/2008 | Cordoba | |
| 2008/0222673 A1 | 9/2008 | Durden et al. | |
| 2008/0270589 A1 | 10/2008 | Hwang | |
| 2008/0292139 A1 | 11/2008 | Wadhwa et al. | |
| 2008/0307105 A1 | 12/2008 | Sethi et al. | |
| 2009/0037945 A1 | 2/2009 | Greig et al. | |
| 2009/0232129 A1 | 9/2009 | Wong et al. | |
| 2009/0281897 A1 | 11/2009 | Antos | |
| 2010/0060477 A1 | 3/2010 | Laasik et al. | |
| 2010/0064334 A1 | 3/2010 | Blackburn et al. | |
| 2010/0131363 A1 | 5/2010 | Sievert et al. | |
| 2010/0157013 A1 | 6/2010 | Sylvain | |
| 2010/0169410 A1* | 7/2010 | Lund et al. | 709/203 |
| 2010/0218170 A1 | 8/2010 | MacLellan et al. | |
| 2010/0220188 A1 | 9/2010 | Renkis | |
| 2010/0232758 A1 | 9/2010 | Cook et al. | |
| 2010/0266111 A1 | 10/2010 | Crausaz et al. | |
| 2010/0306379 A1 | 12/2010 | Ferris | |
| 2011/0029370 A1 | 2/2011 | Roeding et al. | |
| 2011/0035271 A1 | 2/2011 | Weaver et al. | |
| 2011/0069179 A1 | 3/2011 | Bathiche et al. | |
| 2011/0075011 A1 | 3/2011 | Abebe | |
| 2011/0193971 A1 | 8/2011 | Lin | |
| 2011/0205329 A1 | 8/2011 | Willis | |
| 2011/0211678 A1 | 9/2011 | Woodworth et al. | |
| 2011/0254914 A1 | 10/2011 | Ng | |
| 2011/0317587 A1 | 12/2011 | Lida et al. | |
| 2012/0002849 A1* | 1/2012 | Tokuse | 382/118 |
| 2012/0019609 A1 | 1/2012 | Chang et al. | |
| 2012/0054809 A1 | 3/2012 | Chowdhury et al. | |
| 2012/0072936 A1 | 3/2012 | Small et al. | |
| 2012/0081501 A1 | 4/2012 | Benzaia et al. | |
| 2012/0081502 A1 | 4/2012 | Naidu et al. | |
| 2012/0102533 A1 | 4/2012 | Park | |
| 2012/0133515 A1 | 5/2012 | Palshof | |
| 2012/0166517 A1 | 6/2012 | Lee et al. | |
| 2012/0189282 A1 | 7/2012 | Wyatt et al. | |
| 2012/0203823 A1 | 8/2012 | Manglik et al. | |
| 2012/0206553 A1 | 8/2012 | MacDonald | |
| 2012/0207088 A1 | 8/2012 | Liu et al. | |
| 2012/0226752 A1 | 9/2012 | Jeong et al. | |
| 2012/0229591 A1 | 9/2012 | Lee | |
| 2012/0236127 A1* | 9/2012 | Ojala et al. | 348/47 |
| 2012/0266252 A1 | 10/2012 | Spiers et al. | |
| 2012/0315793 A1 | 12/2012 | Hermann et al. | |
| 2012/0331113 A1 | 12/2012 | Jain et al. | |
| 2013/0007157 A1 | 1/2013 | Eftis et al. | |
| 2013/0046280 A1 | 2/2013 | Martin et al. | |
| 2013/0083150 A1 | 4/2013 | Howarter et al. | |
| 2013/0174194 A1 | 7/2013 | Mooneyham | |
| 2013/0231183 A1 | 9/2013 | Zalewski | |
| 2013/0265384 A1 | 10/2013 | Shoemake et al. | |
| 2013/0344961 A1 | 12/2013 | Iannetta | |
| 2014/0123162 A1 | 5/2014 | Karlsson et al. | |
| 2014/0168071 A1 | 6/2014 | Ahmed et al. | |
| 2014/0168344 A1 | 6/2014 | Shoemake et al. | |
| 2014/0173675 A1 | 6/2014 | Ahmed et al. | |
| 2014/0333713 A1 | 11/2014 | Shoemake et al. | |
| 2014/0359647 A1 | 12/2014 | Shoemake et al. | |
| 2014/0375752 A1 | 12/2014 | Shoemake et al. | |
| 2015/0026708 A1 | 1/2015 | Ahmed et al. | |
| 2015/0070516 A1 | 3/2015 | Shoemake et al. | |
| 2015/0243163 A1 | 8/2015 | Shoemake | |
| 2015/0244807 A1 | 8/2015 | Shoemake et al. | |

FOREIGN PATENT DOCUMENTS

| | | |
|---|---|---|
| KR | 2010/0062559 A | 6/2010 |
| KR | 2012/0139251 A | 12/2012 |
| WO | WO 2010/118202 A1 | 10/2010 |
| WO | WO 2010/147281 A1 | 12/2010 |
| WO | WO 2012/076724 A1 | 6/2012 |
| WO | WO 2014/093931 A1 | 6/2014 |
| WO | WO 2014/093932 A1 | 6/2014 |
| WO | WO 2014/093933 A1 | 6/2014 |
| WO | WO 2014/121148 A1 | 8/2014 |
| WO | WO 2015/013592 A1 | 1/2015 |
| WO | WO 2015/031671 A1 | 3/2015 |
| WO | WO 2015/035247 A1 | 3/2015 |

OTHER PUBLICATIONS

AWS, Amazon Simple Storage Service, Amazon Web Services, Inc., 6 pages, Available at: http://aws.amazon.com/s3/; Accessed on Mar. 3, 2014.

(56) References Cited

OTHER PUBLICATIONS

HD Wi-Fi video cameras for iPhone, Android or computer; Dropcam, Inc., 3 pages, Available at: http://web.archive.org/web/20121213184724/https://www.dropcam.com/; Accessed on Feb. 28, 2014.

Wikipedia, the free encyclopedia, Cloud computing, 34 pages, Available at: http://en.wikipedia.org/wiki/Cloud_computing, Accessed on Mar. 3, 2014.

Wikipedia, the free encyclopedia, Cloud stoarge, 5 pages, Available at: http://en.wikipedia.org/wiki/Cloud_storage, Accessed on Mar. 3, 2014.

Wikipedia, the free encyclopedia, Email, 25 pages, Available at: http://en.wikipedia.org/wiki/Email, Accessed on Mar. 3, 2014.

Wikipedia, the free encyclopedia, Hypertext Transfer Protocol, 10 pages, Available at: http://en.wikipedia.org/wiki/Http, Accessed on Mar. 3, 2014.

Wikipedia, the free encyclopedia, SIMPLE, 3 pages, Available at: http://en.wikipedia.org/wiki/SIMPLE, Accessed on Mar. 3, 2014.

Wikipedia, the free encyclopedia, Time-lapse photography, 11 pages, Available at: http://en.wikipedia.org/wiki/Time-lapse_photography, Accessed on Mar. 3, 2014.

Wikipedia, the free encyclopedia, Transmission Control Protocol, 19 pages, Available at: http://en.wikipedia.org/wiki/Transmission_Control_Protocol, Accessed on Mar. 3, 2014.

Wikipedia, the free encyclopedia, XMPP, 10 pages, Available at: http://en.wikipedia.org/wiki/XMPP, Accessed on Mar. 3, 2014.

Amazon "Amazon Cloud Front Documentation" 3 pages, Available at: http://aws.amazon.com/documentation/cloudfront/; Accessed on Feb. 25, 2014.

Amazon "Amazon Simple Storage Service Getting Started Guide" Mar. 1, 2006, 20 pages, Amazon Web Services LLC.

Anderson "SETI@home: An Experiment in Public-Resource Computing" (Nov. 2002) 8 pages, Space Sciences Laboratory, U.C. Berkeley.

Apple "Apple TV 3rd Generation Setup Guide" 36 pages.

Apple, "iOS 8 FaceTime" video calling service; Available at: http://www.apple.com/ios/facetime/; Accessed on Oct. 2, 2014; 3 pages.

Apple "iPhoto for Mac" 6 pages, Available at: https://www.apple.com/mac/iphoto/; Accessed on Feb. 28, 2014.

Apple "OS X Mavericks, Mac App Store" 5 pages, Available at: http://www.apple.com/osx/apps/app-store.html; Accessed on Feb. 28, 2014.

Biscotti camera products; Available at: http://biscotti.com/biscotti; Accessed on Oct. 2, 2014; 1 page.

Blue Host, "The Best Web Hosting", Available at: http://www.bluehost.com/; Accessed on Oct. 2, 2014; 3 pages.

BlueJeans Network; Multi-Party Conferencing in the Cloud; Available at: http://www.bluejeans.com; Accessed on Oct. 2, 2014; 3 pages.

Cerf et al. (1974) "Specification of Internet Transmission Control Program" Network Working Group; 70 pages.

Cisco Collaboration Endpoints; Video calling cameras and systems; Available at: http://www.cisco.com/c/en/us/products/collaboration-endpoints/product-listing.html. Accessed on Oct. 2, 2014; 2 pages.

Data Center Virtualization and Cloud Infrastructure Products; Available at: http://www.vmware.com/products/datacenter-virtualization/; Accessed on Feb. 25, 2014; 5 pages.

DECT "Part 6: Identities and addressing" (1998-02) European Standard (Telecommunications series); 41 pages.

Domain Discover.US "Put Yourself on the Web"; Available at: https://www.tierra.net/domains; 3 pages.

Dropbox Review and Rating, Available at: http://www.pcmag.com/article2/0,2817,2343852,00.asp, Accessed on Feb. 25, 2014, 12 pages.

Fielding et al. (1999) "Hypertext Transfer Protocol—HTTP/1.1" Network Working Group; 114 pages.

Google website; Available at: https://www.google.com/; Accessed on Oct. 2, 2014; 1 page.

Google "Google Apps for Business" 2 pages, Available at: http://www.google.com/enterprise/apps/business/, Accessed on Feb. 28, 2014.

Google "Google Play" 3 pages, Available at: https://play.google.com/store?hl=en, Accessed on Feb. 28, 2014.

Information Sciences Institute (1981) "Internet Protocol"; Available at: http://www.ietf.org/rfc/rfc791.txt Accessed on Oct. 2, 2014; 48 pages.

International Telecommunication Union; E.164: The international public telecommunication numbering plan; Available at: http://www.itu.int/rec/T-REC-E.164/en; Accessed on Oct. 2, 2014; 1 page.

International Telecommunication Union; G.711: Pulse code modulation (PCM) of voice frequencies; Available at: http://www.itu.int/rec/T-REC-G.711; Accessed on Oct. 2, 2014; 1 page.

International Telecommunication Union; G.722: 7kHz audio-coding within 64 kbit/s; Available at: http://www.itu.int/rec/T-REC-G.722; Accessed on Oct. 2, 2014; 1 page.

IP Version 6 Working Group (ipv6); Available at: http://datatracker.ietf.org/wg/ipv6/charter/; Accessed on Oct. 2, 2014; 3 pages.

ITU-T (2007) "H.264 Series H: Audiovisual and Multimedia Systems"; 564 pages.

Johnny Chung Lee Projects—Wii www.johnnylee.net/projects/wii/ Accessed on Sep. 5, 2013, 3 pages.

Lifesize; Video Conference Systems and Accessories; Available at: http://www.lifesize.com/en/products/video-conferencing-systems-and-accessories; Accessed on Oct. 2, 2014; 11 pages.

Linux Foundation, "Why the Xen Project?", Available at: http://www.xenproject.org/users/why-the-xen-project.html, Accessed on Feb. 25, 2014, 5 pages.

Logitech Business Webcams; Available at: http://www.logitech.com/en-us/for-business/products/webcams; Accessed on Oct. 2, 2014; 4 pages.

Ludwig, XEP-0166: Jingle; Available at: http://xmpp.org/extensions/xep-0166.html; Accessed on Oct. 2, 2014; 49 pages.

Mahy et al. (2010) Traversal Using Relays around NAT (TURN): Relay Extensions to Session Traversal Utilities for NAT (STUN); Available at: http://tools.ietf.org/html/rfc5766; Accessed on Oct. 2, 2014; 134 pages.

Microsoft, Xbox Games and Entertainment on All Your Devices; Available at: http://www.xbox.com/en-US/#fbid=_oRvaiAGfk1; Accessed on Oct. 2, 2014; 2 pages.

Nest, Learning Thermostat™ User Guide, 8 pages.

Netflix "Watch TV Shows Online, Watch Movies Online"; Available at: https://www.netflix.com/?locale=en-US; Accessed on Feb. 28, 2014; 1 page.

Nielson People Meters; Available at: http://www.nielsen.com/content/corporate/us/en/solutions/measurement/television.html Accessed on Oct. 2, 2014; 4 pages.

Notification Concerning Availability of Publication of the International Application; PCT Patent Application No. PCT/US2013/075184; mailed Jun. 19, 2014; 1 page.

Notification Concerning Availability of Publication of the International Application; PCT Patent Application No. PCT/US2013/075185; mailed Jun. 19, 2014; 1 page.

Notification Concerning Availability of Publication of the International Application; PCT Patent Application No. PCT/US2013/075186; mailed Jun. 19, 2014; 1 page.

Notification Concerning Availability of Publication of the International Application; PCT Patent Application No. PCT/US2014/014321; mailed Aug. 7, 2014; 1 page.

Notification of Transmittal of the International Search Report and the Written Opinion of the International Searching Authority, or the Declaration for PCT International Application No. PCT/US13/075184; mailed May 13, 2014; 15 pages.

Notification of Transmittal of the International Search Report and the Written Opinion of the International Searching Authority, or the Declaration for PCT International Application No. PCT/US13/075185; mailed Apr. 7, 2014; 12 pages.

Notification of Transmittal of the International Search Report and the Written Opinion of the International Searching Authority, or the Declaration for PCT International Application No. PCT/US13/75186; mailed May 1, 2014; 11 pages.

(56) References Cited

OTHER PUBLICATIONS

Notification of Transmittal of the International Search Report and the Written Opinion of the International Searching Authority, or the Declaration for PCT International Application No. PCT/US14/14321; mailed May 9, 2014; 18 pages.

Nygren, The Akamai Network: A Platform for High-Performance Internet Applications, Akamai Technologies, Cambridge, US, 18 pages.

Oracle VM VirtualBox, 2 pages, Available at: https://www.virtualbox.org/, Accessed on Feb. 25, 2014.

Panasonic (2011) Operating Instructions: KX-TG9471 and KX-TG9472; 64 pages.

Pantos et al. (2013) "HTTP Live Streaming"; Available at: http://tools.ietf.org/html/draft-pantos-http-live-streaming-11; Accessed on Oct. 2, 2014; 74 pages.

Polycom Data Sheet; Polycom® VoiceStation® 300 "Crystal-clear conferencing for smaller rooms and desktops"; 2013 Polycom, Inc.; 2 pages.

Polycom; Polycom HDX Series Product Brochure; Available at: http://www.polycom.com/content/dam/polycom/common/documents/brochures/hdx-family-br-enus.pdf Accessed on Oct. 2, 2014; 4 pages.

Polycom User Guide; VoiceStation™ 300; Polycom, Inc. http://www.polycom.com; 17 pages.

Postel (1982) "Simple Mail Transfer Protocol" Info Sciences Institute, USC; 71 pages.

QEMU, Open Source Processor Emulator, 2 pages, Available at: http://wiki.qemu.org/Main_Page, Accessed on Mar. 4, 2014.

Roku, User Guide (2008-2009), 51 pages,Roku, Inc.

Rosenberg (2010) "Interactive Connectivity Establishment (ICE): A Protocol for Network Address Translator (NAT) Traversal for Offer/Answer Protocols"; Available at: http://tools.ietf.org/html/rfc5245; Accessed on Oct. 12, 2014; 234 pages.

Rosenberg et al. "Session Traversal Utilities for NAT (STUN)"; Available at: http://tools.ietf.org/html/rfc5389; Accessed on Oct. 12, 2014; 102 pages.

Rosenberg, et al. (2002) "SIP: Session Initiation Protocol" http://www.ietf.org/rfc/rfc3261.txt; Accessed on Jun. 27, 2014; 265 pages.

Rosenberg "SIMPLE Made Simple: An Overview of the IETF Specifications for Instant Messaging and Presence Using the Session Initiation Protocol (SIP)" (Apr. 2013) Available at: https://tools.ietf.org/html/rfc6914, Accessed on Feb. 28, 2014.

Saint-Andre, "Extensible Messaging and Presence Protocol (XMPP): Core, Jabber Software Foundation" (Oct. 2004) 73 pages, Available at: http://xmpp.org/rfcs/rfc3920.html, Accessed on Feb. 28, 2014.

Skype video calling service; Available at: www.skype.com/en/; Accessed on Oct. 2, 2014; 4 pages.

Softlayer Services®, 2 pages, Available at: http://www.softlayer.com/services/storagelayer, Accessed on Mar. 4, 2014.

SPEEX: A Free Codec for Free Speech; Available at: http://www.speex.org; Accessed on Oct. 12, 2014; 2 pages.

U.S. Appl. No. 12/561,165 Notice of Allowance dated Feb. 2, 2012; 12 pages.

U.S. Appl. No. 13/857,736 Notice of Publication dated Oct. 10, 2013; 1 page.

U.S. Appl. No. 13/857,736; Ex Parte Quayle Office Action dated Sep. 16, 2014; 8 pages.

U.S. Appl. No. 14/106,279; NonFinal Office Action dated Feb. 28, 2014; 16 pages.

U.S. Appl. No. 14/106,279; Notice of Publication dated Jun. 19, 2014; 1 page.

U.S. Appl. No. 14/106,279; Final Office Action dated Jul. 22, 2014; 17 pages.

U.S. Appl. No. 14/106,360; NonFinal Office Action dated Mar. 20, 2014; 22 pages.

U.S. Appl. No. 14/106,360; Notice of Publication dated Jun. 19, 2014; 1 page.

U.S. Appl. No. 14/170,499; Notice of Publication dated Jun. 19, 2014; 1 page.

U.S. Appl. No. 14/170,499, NonFinal Office Action dated Jul. 18, 2014; 19 pages.

U.S. Appl. No. 14/341,009, filed Jul. 25, 2014; 89 pages.

U.S. Appl. No. 14/464,435, filed Aug. 20, 2014; 111 pages.

U.S. Appl. No. 14/472,133, filed Aug. 28, 2014; 123 pages.

U.S. Appl. No. 14/479,169, filed Sep. 5, 2014; 99 pages.

Varia et al., Overview of Amazon Web Services (Jan. 2014), 22 pages, Amazon Web Services.

Variable Frame Rate MP4; https://kb.speeddemosarchive.com/Variable_Frame_Rate MP4; Accessed on Jun. 27, 2014; 3 pages.

Vidyo, "The Vidyo Experience"; Available at: http://www.vidyo.com/products/use/; Accessed on Oct. 2, 2014; 5 pages.

WebRTC; Available at: http://www.webrtc.org; Accessed on Oct. 2, 2014; 4 pages.

WebSocket.org, Are you plugged in?; "What is WebSocket?"; Available at: http://www.websocket.org; Accessed on Oct. 2, 2014; Kaazing Corporation; 1 page.

Wikipedia, The free encyclopedia, Apache HTTP Server, 5 pages, Available at: http://en.wikipedia.org/wiki/Apache_HTTP_Server, Accessed on Feb. 26, 2014.

Wikipedia, the free encyclopedia; "Audio to Video Synchronization" Available at: http://en.wikipedia.org/wiki/Audio_to_video_synchronization; Accessed on Jun. 27, 2014; 6 pages.

Wikipedia, the free encyclopedia; "cPanel" Available at: http://en.wikipedia.org/wiki/Cpanel; Accessed on Feb. 26, 2014; 4 pages.

Wikipedia, the free encyclopedia; "Distributed computing" Available at: http://en.wikipedia.org/wiki/Distributed_computing; Accessed on Feb. 26, 2014; 12 pages.

Wikipedia, the free encyclopedia; "Face Detection" Available at: http://en.wikipedia.org/wiki/Face_detection; Accessed on Feb. 28, 2014; 2 pages.

Wikipedia, the free encyclopedia; "Face Recognition System" Available at: http://en.wikipedia.org/wiki/Facial_recognition_system; Accessed on Feb. 28, 2014; 10 pages Wikipedia, the free encyclopedia; "Grid computing" Available at: http://en.wikipedia.org/wiki/Grid_computing; Accessed on Feb. 26, 2014; 12 pages.

Wikipedia, the free encyclopedia; "MPEG-4 Part 14" container format; Available at: http://en.wikipedia.org/wiki/MPEG-4; Accessed on Jun. 27, 2014; 4 pages.

Wikipedia, the free encyclopedia, "PlayStation 4" Available at: http://en.wikipedia.org/wiki/PlayStation_4, Accessed on Feb. 25, 2014, 21 pages.

Wikipedia, the free encyclopedia; "Session Initiation Protocol" Available at: http://en.wikipedia.org/wiki/Session_Initiation_Protocol; Accessed Jun. 27, 2014; 6 pages.

Wikipedia, the free encyclopedia; "Speech Recognition" Available at: http://en.wikipedia.org/wiki/Speech_recognition; Accessed on Feb. 28, 2014; 14 pages.

Wikipedia, the free encyclopedia; "VP8" Available at: http://en.wikipedia.org/wiki/VP8; Retrieved Oct. 12, 2014; 8 pages.

Wikipedia, the free encyclopedia; "Wii" Available at: http://en.wikipedia.org/wiki/Wii; Accessed on Feb. 25, 2014; 30 pages.

Wikipedia, the free encyclopedia; "Wolfram Alpha" Available at: http://en.wikipedia.org/wiki/Wolfram_Alpha; Accessed on Feb. 25, 2014; 6 pages.

Wikipedia, the free encyclopedia; "Xbox One" Available at: http://en.wikipedia.org/wiki/Xbox_one; Accessed on Feb. 25, 2014; 16 pages.

XMPP Standards Foundation; Available at: http://xmpp.org/xmpp-protocols/; Accessed on Oct. 2, 2014; 1 page.

Young (1998) "FundamentalsImageProcessing," 113 pages.

Zoom Video Communications, Inc.; Zoom Cloud Video Conferencing; Available at: http://www.zoom.us; Accessed on Oct. 2, 2014; 2 pages.

Google "How Set Up Google Chromecast?" Available at googlechromecast.com/how-set-up-google-chromecast/, retrieved on Apr. 29, 2014, 25 pages.

Google "What is Google Chromecast?" Available at googlechromecast.com/what-is-google-chromecast/ retrieved on Apr. 29, 2014, 6 pages.

(56) References Cited

OTHER PUBLICATIONS

Notification Concerning Transmittal of International Preliminary Report on Patentability by the International Bureau of WIPO for PCT International Application No. PCT/US13/75184; mailed Jun. 25, 2015; 11 pages.
Notification Concerning Transmittal of International Preliminary Report on Patentability by the International Bureau of WIPO for PCT International Application No. PCT/US13/75185; mailed Jun. 25, 2015; 9 pages.
Notification Concerning Transmittal of International Preliminary Report on Patentability by the International Bureau of WIPO for PCT International Application No. PCT/US13/75186; mailed Jun. 25, 2015; 8 pages.
Notification of Transmittal of the International Search Report and the Written Opinion of the International Searching Authority, or the Declaration for PCT International Application No. PCT/US14/48158; mailed Nov. 10, 2014; 12 pages.
Notification of Transmittal of the International Search Report and the Written Opinion of the International Searching Authority, or the Declaration for PCT International Application No. PCT/US14/53254; mailed Dec. 15, 2014; 11 pages.
Notification of Transmittal of the International Search Report and the Written Opinion of the International Searching Authority, or the Declaration for PCT International Application No. PCT/US14/54409; mailed Dec. 16, 2014; 16 pages.
U.S. Appl. No. 14/106,279; NonFinal Office Action dated Mar. 20, 2015; 30 pages.
U.S. Appl. No. 14/106,360; Notice of Allowance dated Oct. 29, 2014; 22 pages.
U.S. Appl. No. 14/170,499; NonFinal Office Action dated Feb. 9, 2015; 39 pages.
U.S. Appl. No. 14/170,499; NonFinal Office Action dated Jun. 3, 2015; 31 pages.
U.S. Appl. No. 14/341,009; NonFinal Office Action dated Apr. 22, 2015; 39 pages.
U.S. Appl. No. 14/464,435; NonFinal Office Action dated Feb. 12, 2015; 33 pages.
U.S. Appl. No. 14/472,133; NonFinal Office Action dated Feb. 11, 2015; 34 pages.
Wikipedia, the free encyclopedia; "Bluetooth" Available at: en.wikipedia.org/wiki/Bluetooth; retrieved on Apr. 29, 2014; 25 pages.
Wikipedia, the free encyclopedia; "Wi-Fi Direct" Available at: en.wikipedia.org/wiki/Wi-Fi_Direct; Retrieved on Apr. 29, 2014; 5 pages.
U.S. Appl. No. 14/341,009; Final Office Action dated Oct. 8, 2015; 35 pages.
U.S. Appl. No. 14/464,435; Final Office Action dated Sep. 21, 2015; 26 pages.
U.S. Appl. No. 14/472,133; Final Office Action dated Sep. 22, 2015; 26 pages.
U.S. Appl. No. 14/479,169; NonFinal Office Action dated Sep. 18, 2015; 76 pages.
U.S. Appl. No. 14/106,279; Final Office Action dated Aug. 3, 2015; 23 pages.
U.S. Appl. No. 14/539,106; NonFinal Office Action dated Sep. 15, 2015; 45 pages.
Notification Concerning Transmittal of International Preliminary Report on Patentability by The International Bureau of WIPO for PCT International Application No. PCT/US14/14321; mailed Aug. 13, 2015; 11 pages.

* cited by examiner

VIDEO CAPTURE, PROCESSING AND DISTRIBUTION SYSTEM

CROSS-REFERENCES TO RELATED APPLICATIONS

This application claims the benefit, under 35 U.S.C. §119 (e), of the following applications: provisional U.S. Patent Application No. 61/877,928, filed Sep. 13, 2013 by Ahmed et al. and titled "Mobile Presence Detection", referred to herein as the "'928 application"); provisional U.S. Patent Application No. 61/874,903, filed Sep. 6, 2013 by Shoemake et al. and titled "Virtual Window", referred to herein as the "'903 application"); provisional U.S. Patent Application No. 61/872,603, filed Aug. 30, 2013 by Shoemake et al. and titled "Physical Presence and Advertising", referred to herein as the "'603 application"); provisional U.S. Patent Application No. 61/858,518, filed Jul. 25, 2013 by Shoemake et al. and titled "Video Calling and Conferencing Advertising", referred to herein as the "'518 application"); provisional U.S. Patent Application No. 61/759,621, filed Feb. 1, 2013 by Shoemake et al. and titled "Video Mail Capture, Processing and Distribution", referred to herein as the "'621 application"); and provisional U.S. Patent Application No. 61/737,506, filed Dec. 14, 2012 by Shoemake et al. and titled "Video Capture, Processing and Distribution System", referred to herein as the "'506 application"). This application may also be related to U.S. patent application Ser. No. 14/106,279, filed on a date even herewith by Ahmed et al. and titled "Mobile Presence Detection", referred to herein as the "Mobile Presence Detection Application") and to U.S. patent application Ser. No. 14/106,360, filed on a date even herewith by Ahmed et al. and titled "Distributed Infrastructure", referred to herein as the "Distributed Infrastructure Application").

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to image and video capture devices, and, more particularly, to tools and techniques for implementing remote control of image and video capture devices, and for implementing remote control of processing and sharing functions associated with captured image and/or video data.

BACKGROUND

The proliferation of capable user devices, pervasive communication, and increased bandwidth has provided opportunity for many enhanced services for users. One example is video calling. Once the domain of high-end, dedicated systems from vendors such as POLYCOM®, video calling has become available to the average consumer at a reasonable cost. For example, the Biscotti™ device, available from Biscotti, Inc., provides an inexpensive tool to allow video calling using a high-definition television and an Internet connection. More generally, a class of devices, which have been described as "video calling devices" but are referred to herein as video communication devices ("VCDs") can be simultaneously connected to a display (such as a television, to name one example) and a source of content (such as a set-top box ("STB"), to name an example) in a pass-through configuration and can have a network connection and/or sensors such as a camera, a microphone, infrared sensors, and/or other suitable sensors. Such devices present a powerful platform for various applications. Examples include, without limitation, video calling, instant messaging, presence detection, status updates, media streaming over the Internet, web content viewing, gaming, and DVR capability. Another example of such value added services is the introduction of online gaming. Rather than playing a game by him- or herself, a user now can play most games in a multiplayer mode, using communication over the Internet or another network.

Enabling such services is a new class of user device, which generally features relatively high-end processing capability (which would have been unthinkable outside supercomputing labs just a few years ago), substantial random access memory, and relatively vast non-transient storage capabilities, including hard drives, solid state drives, and the like. Such user devices can include, without limitation, the VCDs mentioned above, the presence detection devices ("PDD") described in the Mobile Presence Detection Application, various video game consoles, and the like. Such devices generally have a reliable, and relatively high-speed, connection to the Internet (to enable the value added services) and significant amounts of downtime, in which the processing and other capabilities of the devices are unused.

Additionally, several vendors provide security cameras that are capable of communicating over a network. An example of such a device is the Samsung WiFi Surveillance Camera™ available from Samsung Electronics. Such devices enable a user to remotely monitor a scene via images transmitted over a network.

Existing devices, however, do not allow access to live images or live videos from the camera via the Internet, nor do such devices allow the storage of captured image and/or video data on the Internet for future retrieval. Generally, such devices further require the camera to be connected to a display device and require configuration using an interface on that display device, rather than via the Internet.

Hence, there is a need for solutions that allow for more flexible remote access to video and image capture devices, and/or for more flexible configuration options thereof, as well as for more flexible access to remotely captured video and image data, and some such solutions can employ the powerful user devices already resident in many users' homes.

BRIEF SUMMARY

A set of embodiments provides tools and techniques for providing access to Internet-connected cameras, including without limitation image capture devices, from or over the Internet. In some aspects, certain embodiments can provide access from or over the Internet to video and/or images captured by such devices. In other aspects, some embodiments can enable a user to upload captured video and/or images to the Internet (e.g., to the "cloud") for storage and/or later retrieval. In still other aspects, some embodiments can allow for remote configuration of the camera (and/or other device features) from the Internet.

In some embodiments, the captured video and/or image data may be post-processed on a computer in the network, which can include a control server(s), a central server(s), another image capture device(s), and/or the like. In some cases, distributed hosting, including cloud-based computing, cloud-based application hosting, cloud-based data storage, and/or content delivery network service, or the like, as described in detail in the Distributed Infrastructure Application (already incorporated herein) may be utilized to control the Internet-connected camera(s), to perform post-processing of captured video and/or image data, to store raw as well as processed video and/or image data, to share video and/or image data captured by the Internet-connected cameras (including raw and processed video and/or images), to host a website for allowing a user to control such functionalities, and/or the like.

In some instances, presence detection techniques and presence detection devices ("PDDs") described in detail in the Mobile Presence Detection Application may be used to allow for automatic identification and authentication to enable the user to control the Internet-connected cameras, to initiate post-processing of captured video and/or image data, to instruct storing of raw as well as processed videos and/or image data, to share video and/or image data captured by the Internet-connected cameras (including raw and processed video and/or image data), to control such functionalities, and/or the like, regardless of where the user is, so long as the user is in front of a suitable device capable of identification and authentication of the user to provide the user access to a master account for controlling these functionalities. In other words, a profile for accessing control of the above-mentioned functionalities (as well as the (raw/processed) captured video and/or image data) can follow the user.

The tools provided by various embodiments include, without limitation, methods, systems, and/or software products. Merely by way of example, a method might comprise one or more procedures, any or all of which are executed by an ICD, a PDD, and/or a computer system. Correspondingly, an embodiment might provide an ICD, a PDD, and/or a computer system configured with instructions to perform one or more procedures in accordance with methods provided by various other embodiments. Similarly, a computer program might comprise a set of instructions that are executable by an ICD, a PDD, and/or a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might comprise receiving, at a first computer, user input from a user, and controlling, with the first computer, one or more first image capture devices ("ICDs") over a network, based on the user input received from the user. In some instances, each of the one or more first ICDs might comprise a first video input interface to receive first video input from a first local content source (which, in some embodiments, might include a STB and/or the like), a first audio input interface to receive first audio input from the first local content source, a first video output interface to provide first video output to a first video display device, a first audio output interface to provide first audio output to a first audio receiver, a first video capture device to capture at least one of first image data or first video data, a first audio capture device to capture first audio data, a first network interface, at least one first processor, and a first storage medium in communication with the at least one first processor. The first storage medium might, in some cases, have encoded thereon a set of instructions executable by the at least one first processor to perform one or more operations. According to some embodiments, the first computer might include a control server, at least one of the one or more first ICDs, a second ICD separate from the one or more first ICDs, or a video communication device (for example, as described in U.S. patent application Ser. No. 12/561,165, filed Sep. 16, 2009 by Shoemake et al. and titled "Real Time Video Communications System" (issued as U.S. Pat. No. 8,144,182 and referred to herein as the "'182 patent," the disclosure of which is hereby incorporated by reference for all purposes)).

In some embodiments, the method might further comprise registering, with the first computer, a master account for the user, and assigning, with the first computer, the one or more first ICDs to the master account. The method might also comprise receiving, at the first computer and via the network, a request from the user to remotely access the one or more first ICDs, and authenticating the user, at the computer, using a set of credentials associated with the master account. The method might further comprise accessing the one or more first ICDs from the first computer, over the network, after authenticating the user, and providing a user interface, from the first computer, over the network. In some instances, the user input might be associated with options presented by the user interface.

According to some embodiments, assigning the one or more first ICDs to the master account might comprise receiving, at the first computer, a communication from the one or more first ICDs during an initial configuration of the one or more first ICDs. Assigning the one or more first ICDs to the master account might further comprise identifying, with the first computer, the one or more first ICDs based on the communication, and associating, at the first computer, the identified one or more first ICDs with the master account. In some instances, the network is the Internet, and, in some cases, the user interface might comprise a web page. In some embodiments, the first computer might be one of the one or more image capture devices; in other words, one of the ICDs might control another (similar) ICD over the network.

In some embodiments, the method might further comprise authenticating, with the first computer, the one or more first ICDs, and encrypting a communication session between the first computer and the one or more first ICDs. In some cases, the method might also comprise assigning, with the first computer, a second ICD to the master account, the second ICD being a separate and independent device from the one or more first ICDs. According to some aspects, at least one of the one or more first ICDs or the second ICD is a video camera. In some instances, at least one of the one or more first ICDs or the second ICD is incorporated within a computing device or in communication with a computing device, where accessing the at least one of the one or more first ICDs or the second ICD comprises accessing, with the first computer, a software client executing on the computing device.

Merely by way of example, in some aspects, the first storage medium might have encoded thereon a set of instructions executable by the at least one first processor to control operation of the one or more first ICDs. The set of instructions might comprise instructions for controlling the first video capture device to capture a captured video stream, and instructions for controlling the first audio capture device to capture a captured audio stream. The set instructions might further comprise instructions for encoding the captured video stream and the captured audio stream to produce a series of data packets, and instructions for transmitting the series of data packets on the first network interface for reception by a second ICD separate from the one or more first ICDs. In some embodiments, transmission of the series of data packets by the one or more first ICDs and reception of the same by the second ICD may be via peer-to-peer communication or via a control server over the network.

In some embodiments, controlling the one or more first ICDs might comprise causing the one or more first ICDs to capture an image or a video segment. In some cases, controlling the one or more first ICDs might further comprise causing the one or more first ICDs to upload the captured image or video segment to a specified location over the network. In some instances, the specified location might be a cloud storage system. Causing the one or more first ICDs to upload the captured image or video segment might, in some embodiments, comprise causing the one or more first ICDs to upload the captured image or video segment directly to the cloud storage system without transmitting the captured image or video segment to the first computer or any other intermediary server. In some cases, causing the one or more first ICDs to upload the captured image or video segment might further comprise storing the uploaded image or video segment in a location assigned to the one or more first ICDs.

According to some embodiments, the method might further comprise providing the master account with control over and access to the uploaded image or video segment. In some instances, providing the master account with control over and access to the uploaded image or video segment might comprise receiving user input to share the uploaded image or video segment. The method, in some cases, might further comprise creating a public uniform resource locator ("URL") addressing the uploaded image or video segment, and providing the public URL to the user. In some embodiments, the method might comprise displaying the uploaded image or video segment with the user interface.

Controlling the one or more first ICDs might, according to some examples, further comprise causing the one or more first ICDs to capture and upload a plurality of images or video segments. In some cases, the method might comprise receiving, at the first computer, each of the plurality of images or video segments, and refreshing the user interface to display each of the plurality of images or video segments as they are received. In some embodiments, causing the one or more first ICDs to capture and upload a plurality of images or video segments might comprise causing the one or more first ICDs to capture an image periodically on a specified interval. The method, in some instances, might further comprise creating, at the first computer, a time-lapse video from the plurality of captured images.

According to some aspects, controlling the one or more first ICDs might comprise configuring a behavior of the one or more first ICDs. Configuring a behavior of the one or more first ICDs, in some cases, might comprise changing an operating parameter of the one or more first ICDs. The operating parameter might be selected from a group consisting of an address for each of the one or more first ICDs, a nickname for each of the one or more first ICDs, and an avatar image associated with each of the one or more first ICDs.

In some embodiments, controlling the one or more first ICDs might comprise sending a command code to the one or more first ICDs. The command code might comprise at least one of a command code for instructing the one or more first ICDs to perform a network test, or a command code that is part of a set of command codes shared between the one or more first ICDs and the first computer. The method might further comprise modifying the set of command codes to include additional command codes, and transmitting the modified set of command codes from the first computer to the one or more first ICDs Merely by way of example, in some embodiments, receiving user input might comprise receiving user input from a second ICD. The second ICD might comprise a second video input interface to receive second video input from a second local content source (which, in some embodiments, might include a STB and/or the like), a second audio input interface to receive second audio input from the second local content source, a second video output interface to provide second video output to a second video display device, a second audio output interface to provide second audio output to a second audio receiver, a second video capture device to capture at least one of second image data or second video data, a second audio capture device to capture second audio data, a second network interface, at least one second processor, and a second storage medium in communication with the at least one second processor. The second storage medium might, in some cases, have encoded thereon a set of instructions executable by the at least one second processor to perform one or more operations.

In some aspects, the method might further comprise collecting presence information with the second ICD (which might be a presence detection device ("PDD") as described in the Mobile Presence Detection Application). The method might also comprise detecting presence of the user, with the second ICD (or PDD), based at least in part on the presence information, and identifying the user, with a second computer, based at least in part on identifying information derived from at least a portion of the presence information. The method might further comprise receiving, with the second ICD (or PDD), the user input from the user, and in response to identifying the user, sending, with the second ICD (or PDD), the received user input to the one or more first ICDs over the network for controlling the one or more first ICDs.

In some embodiments, identifying the user might comprise one or more of analyzing, with the second computer, at least one of captured second image data or captured second video data, using facial recognition software; comparing, with the second computer, at least a portion of the captured second audio data with a voiceprint; comparing, with the second computer, at least a portion of the captured second audio data with stored challenge/response information; determining, with the second computer, whether a user device that is detected in proximity to the PDD is a device associated with the user; or detecting a presence of a user device that is associated with the user, based on at least one of detecting a Bluetooth connection of the user device, detecting that the user device is associated with a WiFi access point with which the PDD has associated, or communicating with the user device using near field communication ("NFC"). In some embodiments, the second computer can be a control server over the network, another ICD(s), or a user device separate from the control server and any ICD(s), and/or the like.

According to some embodiments, the first computer and the second computer might be the same computer. Alternatively, the first computer and the second computer might be different computers. In some cases, the first computer and/or the second computer might be a control server, one or more other PDDs (as distributed infrastructure elements), one or more other ICDs (as distributed infrastructure elements), and/or the like, all of which might be in communication with the one or more first ICDs and/or the PDD over the network.

In another aspect, an apparatus might comprise a video input interface to receive video input from a local content source (which, in some embodiments, might include a STB and/or the like), an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and a storage medium in communication with the at least one processor. The storage medium might have encoded thereon a set of instructions executable by the at least one processor to perform one or more operations. The set of instructions might comprise instructions for receiving, from a computer over a network, control instructions based on user input from a user, and instructions for controlling the apparatus, based at least in part on the control instructions received from the computer over the network.

In yet another aspect, a system might comprise a computer and an ICD. The computer might comprise one or more processors and a computer readable medium in communication with the one or more processors. The computer readable medium might have encoded thereon a first set of instructions executable by the one or more processors to perform one or more operations. The first set of instructions might comprise instructions for receiving user input from a user over a network, and instructions for controlling the ICD over the network, based on the user input received from the user. The ICD might comprise a video input interface to receive video input from a local content source (which, in some embodiments, might include a STB and/or the like), an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and a storage medium in communication with the at least one processor. The storage medium might have encoded thereon a second set of instructions executable by the at least one processor to perform one or more operations. The second set of instructions might comprise instructions for receiving, from the computer over the network, control instructions based on user input from the user, and instructions for controlling the ICD, based at least in part on the control instructions received from the computer over the network.

In still another aspect, an ICD might comprise a video input interface to receive video input from a local content source (which, in some embodiments, might include a STB and/or the like), an audio input interface to receive audio input from the local content source, a video output interface to provide video output to a video display device, an audio output interface to provide audio output to an audio receiver, a video capture device to capture at least one of image data or video data, an audio capture device to capture audio data, a network interface, at least one processor, and a storage medium in communication with the at least one processor. The storage medium might have encoded thereon a set of instructions executable by the at least one processor to perform one or more operations. The set of instructions might comprise instructions for detecting presence of a user, and instructions for notifying a computer about the detected presence of the user. The set of instructions might further comprise instructions for receiving, over a network, control instructions from the computer to capture at least one of video data or image data of the user, based on the detected presence of the user, and instructions for controlling the image capture device, based at least in part on the control instructions received from the computer over the network. In some embodiments, the computer might include, without limitation, another ICD, a PDD, a VCD, and/or any other suitable user device (including, but not limited to, a smart phone, a mobile phone, a portable computer, a tablet computer, a laptop computer, a desktop computer, and/or the like).

In a non-limiting example, in another aspect, an ICD might be configured to be accessed over a network. The ICD might comprise an image sensor to capture an image, a communication system, one or more processors, and a computer readable medium in communication with the one or more processors. The computer readable medium might have encoded thereon a set of instructions executable by the one or more processors to perform one or more operations. The set of instructions might comprise instructions for receiving, from a computer over a network, control instructions based on user input from a user, and instructions for controlling the ICD, based at least in part on the control instructions received from the computer over the network.

Merely by way of example, a method of providing remote access to an ICD (such as a video camera, a video calling device, or a security camera, just to name a few examples) in accordance with one set of embodiments might comprise registering a master account for a user and/or assigning one or more ICDs to the master account. In some aspects, the method might further comprise receiving, at a computer and via a network, a request from the user to access the ICD. In some cases, the method might include authenticating the user at the computer, using a set of credentials associated with the master account. The computer might comprise a web server and/or might be in communication with a web server, which can provide the user interface and/or communicate user input to the computer.

In a set of embodiments, the method can include accessing the ICD from the computer, over the network. The computer might provide a user interface over the network, and/or might receive user input from the user via the user interface. The method, then, can include controlling the ICD over the network, based on the user input received via the user interface.

A system in accordance with another set of embodiments might comprise a computer. In an aspect, the computer might comprise one or more processors and/or a computer readable medium in communication with the one or more processors. In an embodiment, the computer readable medium can have encoded thereon a set of instructions executable by the computer system to perform one or more operations. In an aspect, the set of instructions might comprise instructions to perform operations in accordance with methods provided by various embodiments.

Merely by way of example, the set of instructions might comprise instructions for registering a master account for a user; instructions for assigning an ICD to the master account; and/or instructions for receiving, via a network, a request from the user to access the ICD. The set of instructions, in various embodiments, might further comprise instructions for authenticating the user, using a set of credentials associated with the master account; instructions for accessing the ICD, over the network; instructions for providing a user interface over the network; instructions for receiving user input from the user via the user interface; and/or instructions for controlling the ICD over the network, based on the user input received via the user interface. In some cases, the system might further comprise one or more ICDs.

An apparatus in accordance with another set of embodiments might comprise a computer readable medium having encoded thereon a set of instructions executable by one or more computers to perform one or more operations, including without limitation operations in accordance with methods provided by various embodiments. Merely by way of example, the set of instructions might include instructions for registering a master account for a user; instructions for assigning an ICD to the master account; and/or instructions for receiving, via a network, a request from the user to access the ICD. The set of instructions, in various embodiments, might further comprise instructions for authenticating the user, using a set of credentials associated with the master account; instructions for accessing the ICD, over the network; instructions for providing a user interface over the network; instructions for receiving user input from the user via the user interface; and/or instructions for controlling the ICD over the network, based on the user input received via the user interface.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
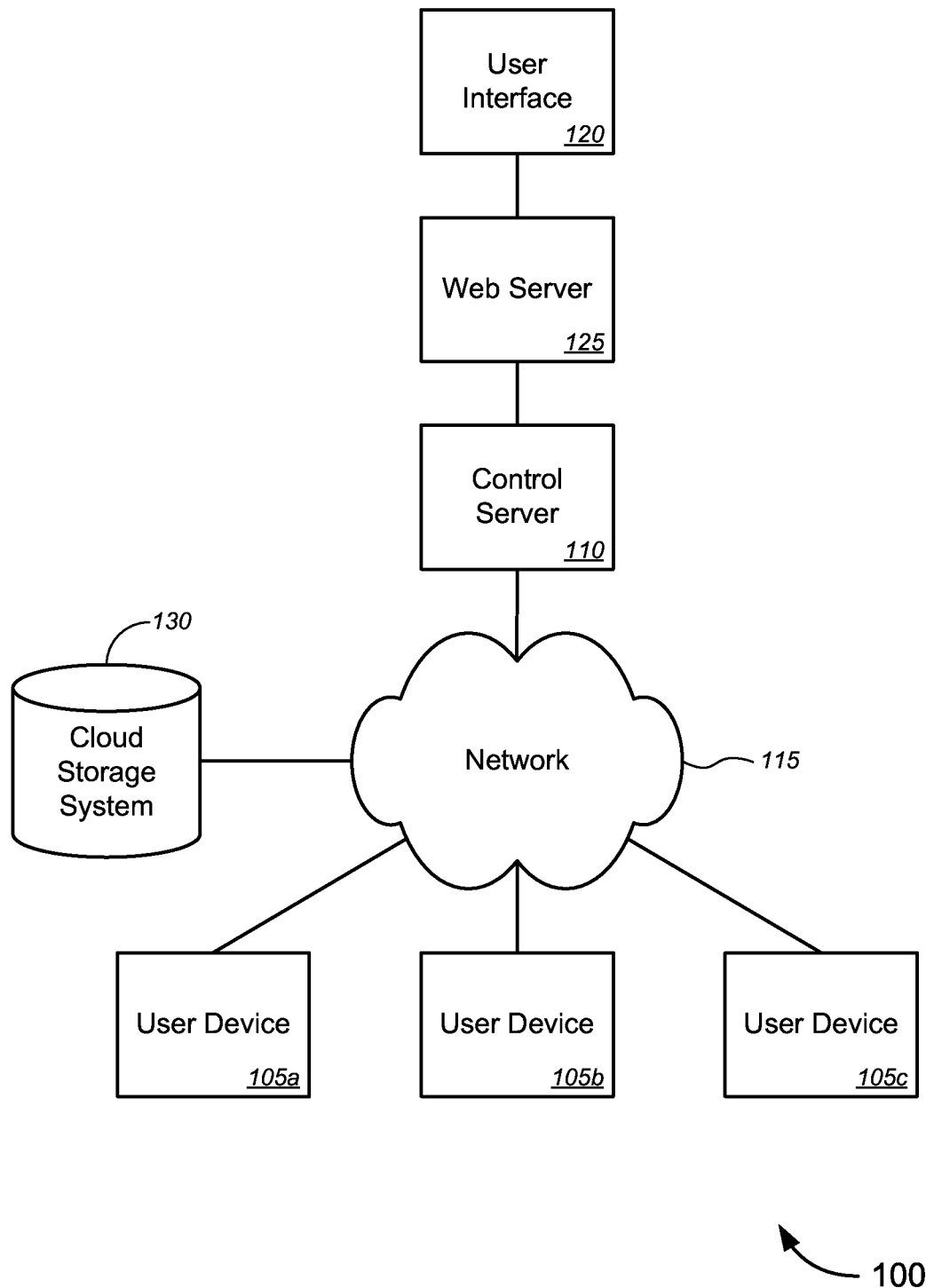
FIG. 1 is a block diagram illustrating a system for implementing remote control of image and video capture devices, and for implementing remote control of processing and sharing functions associated with captured image and/or video data, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features Provided by Various Embodiments

Presence Detection Devices ("PDDs") provided by various embodiments can contain or communicate with, inter alia, cameras, microphones, and/or other sensors (including, without limitation, infrared ("IR") sensors). These sensors, in conjunction with the internal processing capability of the device, can allow the device to detect when a person is in the room. Additionally, through means such as facial recognition and voice detection, or the like, the devices also can automatically recognize who is in the room. More specifically, such devices can detect the presence of a particular individual. In some aspects, Image Capture Devices ("ICDs") might contain or communicate with, inter alia, video capture devices for capturing image data and/or video data. In some cases, ICDs might also contain or communicate with, inter alia, microphones, and/or other sensors (including, without limitation, infrared ("IR") sensors). According to some embodiments, some ICDs might have similar functionality as PDDs.

In various embodiments, presence detection can be local and/or cloud based. In the case of local presence detection, the PDD itself might keep a list of all user profiles and will attempt to match an individual against its local list of all users. In cloud based detection, the functionality of user detection can be moved into servers in the cloud. A cloud based approach allows detection of a user's presence to be mobile among various devices (whether owned by, and/or associated with, the user or not). That same user can be detected on their device or on any other device that has the same capability and that is tied into the same cloud infrastructure.

The ability to automatically detect the presence of an individual on any device presents a powerful new paradigm for many applications including automation, customization, content delivery, gaming, video calling, and others. Advantageously, in some embodiments, a user's content, services, games, profiles, and/or preferences, etc. can follow that user from device to device, including devices that are not owned by (or previously associated with) the individual, as described in detail in the Mobile Presence Detection Application (already incorporated herein). Alternatively, or in addition, presence detection functionality can also allow for mobile presence detection that enables remote access and control of ICDs over a network, following automatic identification and authentication of the user by any device (e.g., PDD, ICD, or other device) so long as such device has authentication functionality that is or can be tied to the access and control of the ICDs, regardless of whether or not such device is owned or associated with the user. In other words, the ability to remotely access and control one's ICDs over a network can follow the user wherever he or she goes, in a similar manner to the user's content and profiles following the user as described in the Mobile Presence Detection Application.

Various sensors on a PDD (and/or an ICD) can be used for user detection. Facial recognition can be used to identify a particular individual's facial characteristics, and/or voice detection can be used to uniquely identify a person. Additionally, PDDs and/or ICDs may also have local data storage. This local data storage can be used to store a database of user profiles. The user profiles can contain the various mechanisms that can be used to identify a person, including username and password, facial characteristics, voice characteristics, etc. When sensors detect the facial features or capture the voice of a particular individual, that captured presence information can be compared against the characteristics of the users on the local storage. If a match is found, then the individual has been successfully identified by the device. (As used herein, the term "presence information" can be any data or information that can be used to determine the presence of a user, and/or to identify and/or authenticate such a user. As such, presence information can include raw image, video, or audio data, analyzed data (e.g., video or image data to which preliminary facial recognition procedures, such as feature extraction, have been employed, as well as verification of audio self-identification or verification of audio challenge/response information), the results of such analysis, and even the end result of the detection process—i.e., a notification that a user is present and/or an identification of the user.)

Detection of a user's presence can also be detected via proximity of a PDD and/or an ICD to another device. For example, if a user's mobile phone, tablet, or PC is near the PDD and/or the ICD, that person is automatically detected. In some instances, a unique device identifier for each of a user's device might have previously been associated with the user's profile in a cloud database or the like (i.e., making the user's devices "known devices"), and detection of such unique device identifiers might serve as a basis for identifying the user, or might streamline the identification process by verifying whether the person with the device owned by or associated with the known device is the user or simply someone in possession of the device(s) (whether lawful or unlawful). Such verification might comprise one or more of facial recognition, voice recognition, audio challenge/response verification, biometric analysis, or the like. In some cases, audio challenge/response verification might include analysis of sub-vocal responses from the person challenged, to prevent undesired casual overhearing of audio passwords, audio keyphrases, or the like. In some instances, biometric analysis might include analysis of any suitable biometric (aside from facial and voice recognition) selected from a group consisting of fingerprint, iris, pupil, height, unique scar(s), other unique physical characteristics, and/or any combination of these biometrics. To capture biometric information such as fingerprints, iris, pupil, height, scar, or other unique physical characteristics, which might be image-based biometrics (which might be captured by a high resolution video capture device of the PDD and/or the ICD), the PDD and/or the ICD might prompt the person being identified to position himself or herself so that his or her fingerprints, iris, pupil, full body, scar, or other unique physical characteristics, respectively, are appropriately facing the video capture device of the PDD and/or the ICD.

In some embodiments, with detection of known devices and with automatic detection/identification processes being enabled, it may be possible for the system to identify persons not normally associated with a known device being in possession of the known device. In such a case, the system might notify the original user (via e-mail or other forms of communication indicated in the user's profile, or the like) of the situation. In some instances, the user might indicate that the unknown person does have authority or permission to use, or be in possession of, the user's device. In other cases, where the user indicates that the user does not have authority or permission to use the device, the user may be given options to proceed, including, without limitation, options to lock data, options to lock device functions, options to activate location tracking (including, without limitation, global positioning system ("GPS"), global navigation satellite system ("GNSS"), etc.) of the device (in case the system loses track of the device; e.g., in the case the device moves outside the range of the system's sensor/detection/communications systems), options to contact the unknown person, options to activate speakers to emit sirens, options to activate displays or lights (e.g., light emitting diodes ("LEDs"), organic LEDs ("OLEDs"), liquid crystal displays ("LCDs"), etc.), and/or options to notify authorities (e.g., police or other law enforcement personnel) of the situation and/or the location of the device (e.g., GPS coordinates, or the like), etc.

Additionally and/or alternatively, proximity detection can be done using GNSS location tracking functionality, which can be found in many electronic devices and authenticating the user when the secondary device is within a predefined distance of the PDD and/or ICD. Proximity detection can also be done wirelessly via Bluetooth or WiFi. With respect to Bluetooth, if the secondary device pairs with the PDD and/or the ICD, the user can be considered detected. With respect to WiFi, one approach could be to see if the secondary device associates with the same WiFi access point that the PDD and/or the ICD is connected to. Another approach to proximity detection is the use of near-field communications ("NFC") commonly found in many electronic devices. When the secondary device is within range of the PDD and/or ICD, a NFC detector can be used to determine that the user is in the room. From these examples, a skilled reader should appreciate that many different techniques can be used to detect presence based on device proximity.

In some embodiments, detection of an individual can be fully automatic and might (in some instances) require no user interaction. For example, the system can characterize an individual's facial features (and/or unique physical characteristics or other biometrics) automatically, detect the presence of a secondary device, characterize an individual's voice print automatically, etc. Several detection methods can be used in combination to reduce errors in the detection process. For example, if the system detects a person in the room and first identifies that person's facial features, it can then prompt them for voice (e.g., "Bob is that you?"). Once the user's voice is captured, that audio sample can be compared against the stored voice characteristics for that user, to reduce false detection. Another approach for the second step may be to prompt the user to speak a PIN or password to be compared against what is stored in the user profile. Using this approach, the characteristics of the speech (e.g., user's voice, cadence, syntax, diction) and the content of the speech (e.g., a PIN or password) can be jointly used to reduce false detections. To prevent eavesdropping of passwords or PINs, the audio capture device might be configured to capture subvocalizations of the passwords or PINs, for analysis. Alternatively and/or additionally, the system can prompt the user to position his or her body so as to allow the video capture device to face one or more of the user's fingers (e.g., for fingerprint analysis), the user's eyes (e.g., for iris and/or pupil analysis), the user's full body (e.g., for height analysis), portions of the user's body (e.g., for analysis of scars or other unique physical characteristics, or the like), etc.

In some embodiments, physical geography can be used as a metric in detection to reduce the possibility of errors. For example, if a user is known to use the system in Dallas, Tex., and then is detected in Madrid, Spain, the system can weigh detection in Spain lower than detection in Dallas. Additionally, if the user is detected in Spain, a secondary authentication method may optionally be invoked to reduce false detection. According to some embodiments, in the case that the system has access to profile or other personal information of the user such as communications, calendar items, contacts list, travel/itinerary information, or the like that might indicate that the user might be visiting a friend or relative in Spain having a similar PDD and/or ICD linked to a common network or cloud server, the system might determine that the user is or will be in Spain. In such a case, the user's profiles, media content, or the like (or access thereto) might be sent to the friend's or relative's device in Spain or to a local data center or the like to allow the user to access the user's own content or profiles on the friend's or relative's device during the visit; in particular embodiments, the user's profiles might include access and control information for remotely accessing and controlling the user's ICDs over a network, while the user's content might include image data and/or video data captured by the user's ICDs (either in raw or processed form). After the scheduled visit, it may be determined using any combination of the user's personal information, the user's devices (including the user's PDD and/or ICD, mobile devices, etc.), and/or the friend's or relative's device whether the user has left the friend's or relative's location (in this example, Spain). If so determined, the content and profiles (or access thereto, as the case may be) might be removed from the friend's or relative's device (and/or from the data center or the like that is local to said device).

In particular embodiments, a PDD and/or an ICD can also be connected to a network, such as the Internet. In such a scenario, the database of user profiles, including identifiable facial and/or voice characteristics, as well as other identifying information (e.g., passwords, identifying information for other devices owned by the user, etc.), can be stored on servers located in the cloud, i.e., on the network or in a distributed computing system available over the network. In some cases, the distributed computing system might comprise a plurality of PDDs and/or a plurality of ICDs in communication with each other either directly or indirectly over the network. The distributed computing system, in some instances, might comprise one or more central cloud servers linking the plurality of PDDs and/or the plurality of ICDs and controlling the distribution and redundant storage of media content, access to content, user profiles, user data, and/or the like. When an individual's facial features are detected by a PDD and/or an ICD, those features (and/or an image captured by the PDD and/or the ICD) can be sent to a server on the network. The server then can compare the identifiable facial features against the database of user profiles. If a match is found, then the server might inform the device of the identity of the user and/or might send a user profile for the user to the device.

User profiles, including facial characteristics, can be stored both locally on the device and on a server located in the cloud. When using both device-based and cloud-based databases, user identification can be performed by first checking the local database to see if there is a match, and if there is no local match, then checking the cloud-based database. The advantage of this approach is that it is faster for user identification in the case where the user profile is contained in the local database. In some embodiments, the database on the device can be configured to stay synchronized with the database in the cloud. For example, if a change is made to a user profile on the device, that change can be sent to the server and reflected on the database in the cloud. Similarly, if a change is made to the user profile in the cloud-based database, that change can be reflected on the device database.

Matching presence information or identifying information with an individual having a user profile can be a form of authentication in some embodiments. User profiles can also contain information necessary for many authentication mechanisms. Such information may include challenge/response pairs (such as username and password combinations, security question/pass phrase combinations, or the like), facial recognition profiles, voice recognition profiles, and/or other biometric information, such as fingerprints, etc. An individual may be authenticated using any combination of such techniques.

In some cases, the system can also determine when a user is no longer present. Merely by way of example, a PDD and/or an ICD might continually (or periodically) monitor for the user's presence. For instance, in the case of facial recognition, the device can continually check to detect whether a captured image includes the user's face. With voice recognition, after a period of inactivity, the device might prompt the user if they are there (e.g., "Bob, are you still there?").

According to some embodiments, user profiles can work across heterogeneous networks. Not all user devices need to be the same. Some user devices might be PDDs and/or ICDs. Other user devices might be computers, tablets, mobile phones, etc. Each can use any appropriate method (based on device capabilities) to determine the presence of, identify, and/or authenticate the user of the device with a user profile.

In an aspect, this automated presence detection can be used to provide user information (e.g., content or services) to an identified user. With a PDD and/or an ICD, when a user enters the room, and the camera sensors detect that user's facial features (or other biometric features) and authenticates the individual, the content associated with that user profile (including, without limitation, profile information for remotely accessing and/or control the user's ICD(s) over a network) can automatically become available to that individual. Additionally, with the cloud-based authentication approach described herein, that user's content and/or profiles can become available on any device. More specifically, if a user is identified by another PDD and/or ICD, then his or her content (e.g., image or video data captured by the user's ICD(s), either in raw or processed form, and/or the like) becomes available to him or her even if the PDD and/or ICD that he or she is in front of is not the user's own device. This functionality allows a new paradigm in which the user's content and/or profiles follow the user automatically. Similarly, when upgrading PDDs and/or ICDs, detection, identification, and authentication of the user on the new device can allow automatic and easy porting of the user's content and/or profiles to the new device, allowing for an ultimate type of "plug-and-play" functionality, especially if the profiles include information on configurations and settings of the user devices (and interconnections with other devices).

PDDs and/or ICDs also are capable of handling, transmitting, and/or distributing image captured content, which can include, but is not limited to, video data and/or image data captured by the ICDs. In some cases, the video data and/or image data might be raw data, while in other cases they might be post-processed data. In some instances, post-processed data might include time-lapse video segments, and/or the like. Image captured content can be stored on servers in the cloud, on PDDs/ICDs in the cloud, and/or locally on a particular user device. When accessing image captured content from another device, the first PDD and/or ICD that has the image captured content stored thereon needs to serve the content to the new device that the content owner is using. In order to do this, the new PDD and/or ICD might need to get a list of image captured content that is stored on the first PDD and/or ICD. This can, in some embodiments, be facilitated via a server that is in the cloud that all PDDs and/or ICDs are always or mostly connected to. The server can communicate with all PDDs and/or ICDs and help send messages between PDDs and/or ICDs. When a user is authenticated with a new PDD and/or ICD, the new device can request the content list from the first device. If the content owner requests content from the new device, then the first PDD and/or ICD (or the other user device) can serve the content to the new device. This can be done either directly in a peer-to-peer fashion or can be facilitated by the server. In some embodiments, this communication can be accomplished by using protocols such as XMPP, SIP, TCP/IP, RTP, UDP, etc.

As discussed above, identification and authentication of a user by a PDD (whether or not associated with or owned by the user) can provide the user with remote access and control of the user's ICD(s) over a network (e.g., by porting the user's profiles associated with remote access and control of the user's ICD(s), and/or the like to the current PDD in front of which the user is located). This functionality allows the user to remotely monitor the user's premises or office (or other location at which the user's ICD(s) are located). In some embodiments, for ICD(s) having similar functionality as the PDD, such ICD(s) can detect and/or identify people at the user's premises or office (or other location at which the user's ICD(s) are located). By similar identification processes as discussed herein or in the Mobile Presence Detection Application, it may be determined whether such people are known and/or authorized to be at the user's premises or office, etc. (i.e., whether such people are family or friends, etc.), or whether such people are unauthorized (e.g., burglars, robbers, unauthorized family or friends, etc.). Automatic notifications may be sent to the user (e.g., via e-mail, text message, etc.) when unauthorized people are detected and/or identified by the user's ICD(s). In some embodiments, certain users might have subscriptions or other access to certain criminal databases (e.g., databases compiled by watchdog groups, private citizens, police, etc.), in which case identification of people in the user's premises or office (or other location at which the user's ICD(s) are located) might include comparing identifying information obtained by the ICD(s) with information in these criminal databases. In the case that a known criminal (or even an unknown unauthorized person) is detected and identified by the ICD(s), the system might automatically notify the user and/or police (or other authorities).

Master Account

Some embodiments employ a master account for access to an ICD. In an aspect, a master account can be created on a per user basis. This master account might serve as the top-level identifier for a particular user. The master account is used to manage, control, and monitor a user's camera(s). Additionally, the master account can be used to control any account or device level services that are available.

For example, an email account and password can be used as a master account to manage a user's camera(s).

Camera Association

For proper management and control of a camera, some embodiments provide the ability to reliably associate a camera with a master account (i.e., assign the camera to the master account). When a camera is associated with an account, then it can be managed and controlled from within the master account. Association ensures that a camera is being controlled by the appropriate user and not an unauthorized user.

A camera may be associated with a particular master account at the time of the device setup. During device setup, the user is prompted to enter a master account and password. When doing so, a secure communications channel may be opened up between camera and servers. Then, a unique and difficult to guess key can be sent from the device to the server. Servers that have a master list of all keys then can associate that particular device, via its serial number, to a particular master account. A feature of this approach is that a user only needs to enter a password at the time of device setup. The user never needs to enter a password again, and in fact, passwords do not need to be stored on the device at all, making them very secure.

Device Management and Remote Configuration

Once a device has been associated with a master account, it may be managed from the master account via an interface such as a web interface, in accordance with some embodiments. The communication link between the device and server may, in some cases, be always encrypted and authenticated. This ensures that messages between device and server are secure and ensures that the device knows it is communicating with the server on behalf of the appropriate master account. Once the secure and authenticated link is established, devices can connect to the server and are able to send and receive commands.

The device and server can have a common set of command codes and responses. Servers can send commands down to the camera(s) to enact specific behavior. For example, the server can send remote configuration commands. These commands can be items such as changing the device address, changing the nickname that is associated with the device, changing the avatar image associated with the device. In addition to configuration, the commands can be used to enact specific behavior on the device, such as running network tests, or taking a live image(s) from the camera. New commands and features can be added by extending the set of command codes on the device and server.

Live Image Upload

One command that can be issued from the server to the camera is a request for a live image(s) from the camera itself. When received by the device it turns on its camera, takes an image(s) and proceeds to upload it the server in a secure location in a manner such that the images cannot be read or opened by others. Images for a particular device are all uploaded into a directory that is specific for that device.

Live Image Display

In one embodiment, when the master account user logs into the web interface, the server sends a command to each of the camera devices that are associated with the master account to upload its live image. Each time an image is received by the server, the web interface updates the live shot that is displayed for that device and sends a request to the camera to upload another live image shot.

Time Lapse Video Creation

Cameras can be configured to continuously upload their live images to the server. This can be done by configuring the device via its on screen user interface ("UI") or by sending the appropriate command from the server to configure the camera to continuously upload its image. Images are uploaded in a manner in which the time the image was taken is marked. The frequency of image upload can be configured as well.

Once images are uploaded to the servers, they can be post-processed into time lapse videos. The start and end time of videos is configurable. For example, videos can be generated for a day, hour, or week. Additionally, the length of videos also depends on the frequency of image upload as well. In a non-limiting example, if a device uploads an image every 10 seconds, and the server is configured to process images at a rate of 30 frames/second, and time lapse videos are being generated for each day, then the length of videos are approximately $\frac{1}{10}$ (images/sec)×86400 (sec/day)×$\frac{1}{30}$ (sec/image)×$\frac{1}{60}$ (min/sec)=4.8 minutes.

In an aspect of some embodiments, the image upload and video creation architecture is designed to be highly scalable. The cameras are designed to upload directly to the cloud storage. They do not need to upload to an intermediary server(s), and therefore avoids unnecessary bandwidth bottlenecks. The video creation architecture is also designed to be highly parallelizable. Servers process videos completely independently of one another. This is key as no centralized server is required to coordinate video creation amongst the "worker" servers. As the camera user base scales, more "worker" servers can be brought online instantly to handle the video processing workload.

Sharing of Videos

The web interface is engineered to easily share user generated time-lapse videos with others. All videos that are generated are private by default, i.e., only the master account owner can view videos generated by devices associated with the master account. The videos, which are stored on the server, can only be played when the master account owner is logged into the web interface (for instance).

However, if the master account owner desires, he or she can share videos with others. When a video is shared, a public link to the video is generated. This link can be emailed to others and allows others to click on a link to the video to access it.

Exemplary Embodiments

FIGS. 1-6 illustrate exemplary embodiments that can provide some or all of the features described above. The methods, systems, and apparatuses illustrated by FIGS. 1-6 may refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 illustrates a functional diagram of a system 100 for controlling one or more PDDs and/or one or more ICDs (labeled user devices 105 in FIG. 1 for ease of illustration, but described herein as PDDs or ICDs, each of which can be considered a type of user device). The skilled reader should note that the arrangement of the components illustrated in FIG. 1 is functional in nature, and that various embodiments can employ a variety of different structural architectures. Merely by way of example, one exemplary, generalized architecture for the system 100 is described below with respect to FIG. 5, but any number of suitable hardware arrangements can be employed in accordance with different embodiments.

An ICD 105 or a PDD 105 can be any device that is capable of communicating with a control server 110 over a network 115 and can provide any of a variety of types of video communication functionality Merely by way of example, in some aspects, an ICD 105 or a PDD 105 can be capable of providing pass through video/audio to a display device (and/or audio playback device) from another source (such as a local content source), and/or overlaying such video/audio with additional content generated or received by the ICD 105 or the PDD 105. In other aspects, an ICD 105 or a PDD 105 can comprise one or more sensors (e.g., digital still cameras, video cameras, webcams, security cameras, microphones, infrared sensors, touch sensors, and/or the like), and/or can be capable, using data acquired by such sensors, of sensing the presence of a user, identifying a user, and/or receiving user input from a user; further, an ICD 105 or a PDD 105 can be capable of performing some or all of the other functions described herein and/or in the Related Applications. Hence, in various embodiments, an ICD 105 or a PDD 105 can be embodied by a video calling device, such as any of the VCDs described in the '182 patent, a video game console, a streaming media player, to name a few non-limiting examples.

In one aspect of certain embodiments, as described more fully with respect to FIG. 3 below, an ICD 105 or a PDD 105 can be placed functionally inline between a local content source and a display device. A local content source can be any device that provides an audio or video stream to a display device and thus can include, without limitation, a cable or satellite set-top box ("STB"), an Internet Protocol television ("IPTV") STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. When situated functionally inline between a local content source and a display device, the ICD or the PDD can receive an audiovisual stream output from the local content source, modify that audiovisual stream in accordance with the methods described herein, in the '182 patent, and/or in the Mobile Presence Detection Application, and provide the (perhaps modified) audiovisual stream as input to the display device. It should be noted, however, that, in some cases, the functionality of a local content source can be incorporated within an ICD or a PDD, and/or the functionality of an ICD or a PDD can be incorporated within a local content source; further, it should be appreciated that an ICD or a PDD (which might or might not include local content source functionality) can be disposed inline with one or more other local content sources or one or more other ICDs/PDDs. Hence, for example, an ICD or a PDD with some local content source functionality (such as a video game console) might be disposed inline between one or more other local content sources or one or more other ICDs/PDDs (such as a cable STB, satellite STB, IPTV STB, and/or a streaming media player) and a display device.

In an aspect of some embodiments, the system can include a software client that can be installed on a computing device (e.g., a laptop computer, wireless phone, tablet computer, etc.) that has a built-in camera and/or has a camera attached (e.g., a USB webcam). This client can act as an interface to allow remote control of the built-in and/or attached camera on the computing device. In some embodiments, the computing device might have a built-in microphone(s) and/or has a microphone(s) attached (e.g., a table-top microphone, a wall-mounted microphone, and/or a microphone removably mountable on a television, on the ICD, on the PDD, and/or on some other suitable user device, or the like). The software client can alternatively and/or additionally act as an interface to allow remote control of the built-in and/or attached microphone on the computing device. In some cases, the camera and/or microphone can be automatically or autonomously controlled to obtain optimal video and/or audio input.

The system 100 can further include a control server 110, which can have any suitable hardware configuration, and an example of one such configuration is described below in relation to FIG. 4. In one aspect, the control server 110 is a computer that is capable of receiving user input via a user interface 120 and/or performing operations for controlling the ICD(s) 105 and/or the PDD(s) 105, for example as described in further detail below. As used with regard to the relationship between the control server 110 and an ICD 105 or a PDD 105, the term "control" should be interpreted broadly to include any operations that operate, configure, or directly control the ICD 105 or the PDD 105, as well as operations that facilitate communication between the ICD 105 or the PDD 105 and other devices, networks, content sources, and the like, and/or operations that provide processing support to an ICD 105 and/or a PDD 105. Merely by way of example, however, the control server 110 can detect user presence, identify/authenticate users, and/or obtain and distribute content to present users. In other cases, the control server can receive and/or store user input and/or user preferences that can specify whether and how presence information should be used, whether and how the user's ICD(s) and/or PDD(s) may be used in the distributed infrastructure, whether and how the user's content and profiles should be handled under certain situations, and/or the like.

For example, preferences might specify which content or other information should be delivered to a user when present at a device not owned by the user, whether presence information should be collected for that user at all (and/or where such information should be collected); for example, a user might specify that his presence should only be monitored in selected locations or from selected devices, and the control server 110 might remove that user's profile from the search universe when provided with presence information from a device not at the selected location or from a device other than one of the selected devices. More generally, the user preference can include any types of parameters related to collecting presence information, using presence information, and/or serving content. These preferences might be stored in a user profile at the control server 110, which might also include other user-specific information, such as the user's normal location(s), identifying information (such as MAC address, etc.) of other user devices owned by or associated with the user, lists of or links to content owned by the user, and/or the like.

In some embodiments, user preferences might specify how the user would like his or her user devices to participate (or not) in a distributed infrastructure arrangement. For instance, the user preferences might include, without limitation, preferences indicating whether or not to allow a user device owned by the user to be used for distributed infrastructure; preferences indicating what type of software applications, customer data, and/or media content (of other user device users and/or subscribers of a cloud service) are permitted to be hosted on a user device owned by the user; and/or preferences indicating amount of resources of a user device to dedicate to the distributed infrastructure; etc. In some embodiments, in addition to indicating how a user's user device may be used in distributed infrastructure implementation, user preferences might allow a user to indicate how the user's own applications, data, and/or media content may be hosted on other users' user devices. For example, the user might be given the option to encrypt any and/or all personal data, any and/or all personal applications, and/or any and/or all files or lists indicating which media content are associated with the user. Common media content (which might include popular media content, or any other media content) may remain unencrypted for common usage by any number of users on any number of user devices, subject only to any subscription, rental, or purchase restrictions on the particular media content as associated with any user and/or any user device.

In some examples, the user might indicate that her user device may be used for distributed processing, but not distributed cloud-based data storage, or vice versa. Alternatively, the user might indicate that her user device may be used for both distributed processing and distributed cloud-based data storage. In some embodiments, the user might allow the hosting, on his or her user device, of at least portions of software applications that are published by known and reputable software companies or published by companies on behalf of governmental agencies, or the like, while blocking hosting of software applications associated with marketing, spam, data mining, and/or potential copyright violations, etc. These and other preferences related to distributed infrastructure functionality are described in greater detail in the Distributed Infrastructure Application (which is already incorporated herein by reference).

With respect to video capture, processing, and distribution functionality, user preferences might include, without limitation, preferences indicating one or more ICD(s) to associate with a master account, preferences indicating under what conditions the one or more ICD(s) should automatically capture image data and/or video data, preferences indicating whether presence detection functionality (as described in detail in the Mobile Presence Detection Application) should or should not be enabled in a particular one(s) of the one or more ICD(s), preferences associated with transfer of captured image data and/or captured video data, preferences indicating whether or not (and under what conditions) captured image data and/or video data should be post-processed (and how), preferences indicating whether or not (and under what conditions) time-lapse video segments should be generated based on captured image data and/or video data (and how), and/or the like.

The control server 110 can provide a user interface (which can be used by users of the ICDs 105 and/or the PDDs 105, advertisers, and/or the like). The control server 110 might also provide machine-to-machine interfaces, such as application programming interfaces ("APIs"), data exchange protocols, and the like, which can allow for automated communications with the ICDs 105 and/or the PDDs 105, etc. In one aspect, the control server 110 might be in communication with a web server 125 and/or might incorporate the web server 125, which can provide the user interface, e.g., over the network to a user computer (not shown in FIG. 1) and/or a machine-to-machine interface. In another aspect, the control server 110 might provide such interfaces directly without need for a web server 125. Under either configuration, the control server 110 provides the user interface 120, as that phrase is used in this document. In some cases, some or all of the functionality of the control server 110 might be implemented by the ICD 105 and/or the PDD 105 itself.

In an aspect, the user interface 120 allows users to interact with the control server 110, and by extension, the ICDs 105 and/or the PDDs 105. A variety of user interfaces may be provided in accordance with various embodiments, including without limitation graphical user interfaces that display, for a user, display fields on display screens for providing information to the user and/or receiving user input from a user.

Merely by way of example, in some embodiments, the control server 110 may be configured to communicate with a user computer (not shown in FIG. 1) via a dedicated application running on the user computer; in this situation, the user interface 120 might be displayed by the user computer based on data and/or instructions provided by the control server 110. In this situation, providing the user interface might comprise providing instructions and/or data to cause the user computer to display the user interface. In other embodiments, the user interface may be provided from a web site, e.g., by providing a set of one or more web pages, which might be displayed in a web browser running on the user computer and/or might be served by the web server 125. As noted above, in various embodiments, the control system 110 might comprise the web server and/or be in communication with the web server 125, such that the control server 110 provides data to the web server 125 to be incorporated in web pages served by the web server 125 for reception and/or display by a browser at the user computer.

Figure 6:
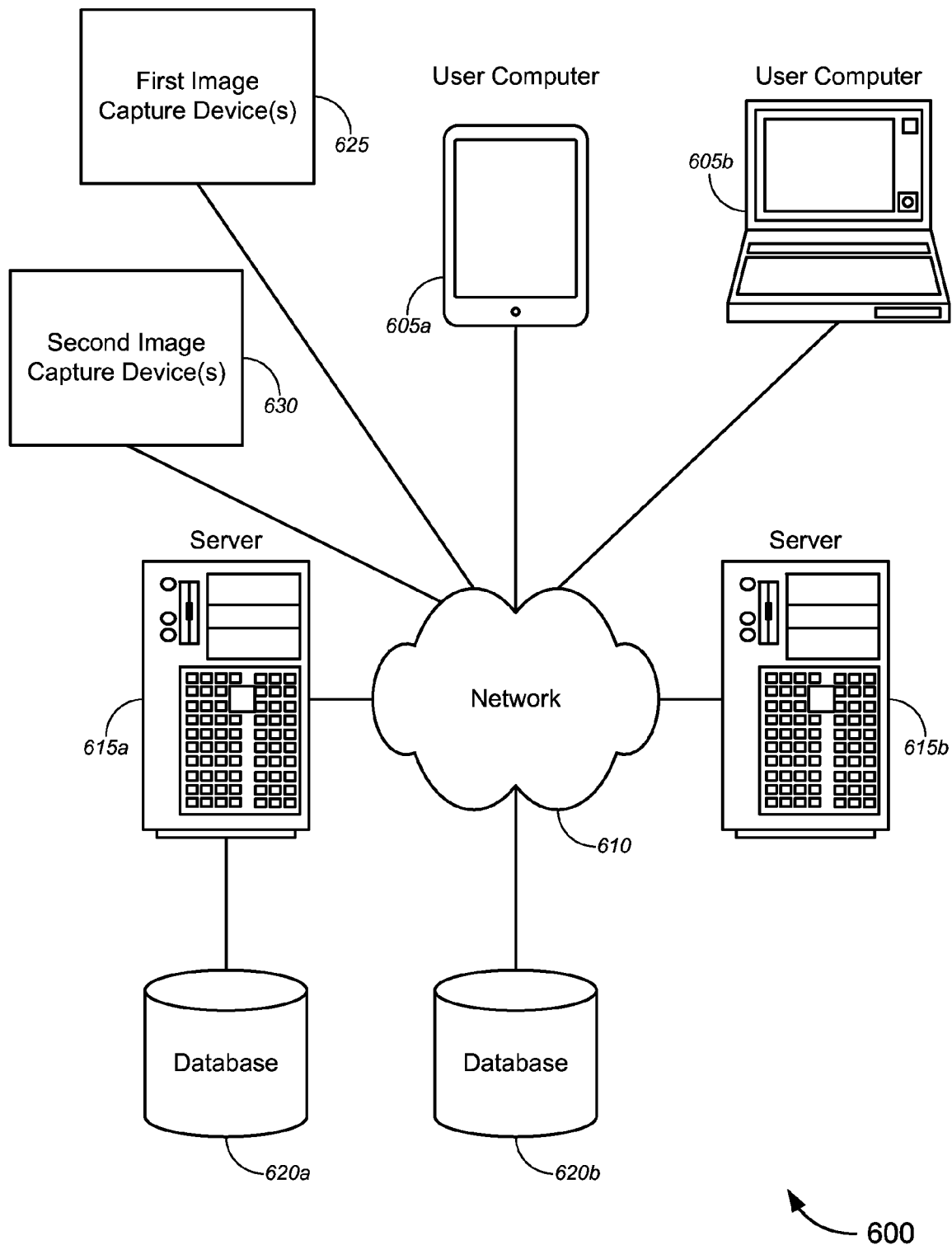
FIG. 6 is a block diagram illustrating a networked system of computers, which can be used in accordance with various embodiments.

The network 115, specific examples of which are described below with regard to FIG. 6, can be any network, wired or wireless, that is capable of providing communication between the control server 110 and the ICDs 105 and/or the PDDs 105, and/or of providing communication between the control server 110 (and/or the web server 125) and a user computer. In a specific embodiment, the network 115 can comprise the Internet, and/or any Internet service provider ("ISP") access networks that provide Internet access to the control server 110, the user computer, and/or the ICDs 105 and/or the PDDs 105.

In some embodiments, the system 100 can include a cloud storage system 130, which can be used, as described in further detail below, to store advertisements, presence information, images, and/or video that are captured and uploaded by the ICDs 105 and/or the PDDs 105, and/or the like. In some cases, the cloud storage system 130 might be a proprietary system operated by an operator of the control server 110. In other cases, the cloud storage system 130 might be operated by a third party provider, such as one of the many providers of commercially available cloud services. In yet a further embodiment, the cloud storage system 130 might be implemented by using resources (compute, memory, storage network, etc.) shared by a plurality of ICDs, and/or by a plurality of PDDs, that are distributed among various users of the system. Merely by way of example, as described in further detail below and in the Distributed Infrastructure Application (already incorporated by reference herein), a plurality of user ICDs and/or PDDs might each have some dedicated resources (such as a storage partition), which are dedicated for use by the system, and/or some ad hoc resources (such as network bandwidth, memory, compute resources, etc.) that are available to the system when not in use by a user. Such resources can be used as cloud storage and/or can be used to provide a distributed, cloud-like platform on which a control server can run as a virtual machine, cloud container, and/or the like.

According to some embodiments, ICD 105 might comprise a first video input interface to receive first video input from a first local content source (which in some embodiments can include a STB and/or the like) and a first audio input interface to receive first audio input form the first local content source. ICD 105 might further comprise a first video output interface to provide first video output to a first video display device and a first audio output interface to provide first audio output to a first audio receiver. In some cases, the first video display device and the first audio receiver might be embodied in the same device (e.g., a TV with built-in speaker system, or the like). With the input and output interfaces, ICD 105 might provide pass-through capability for video and/or audio between the first local content source and the first display device. In some instances, high-definition multimedia interface ("HDMI") cables or other suitable HD signal cables may be used to provide the interconnections for the pass-through. ICD 105 may, in some cases, comprise a first video capture device to capture at least one of first image data or first video data and a first audio capture device to capture first audio data. ICD 105 may also comprise a first network interface, at least one first processor, and a first storage medium in communication with the at least one first processor.

In some aspects, a plurality of ICDs 105 might be communicatively coupled together in a network (e.g., network 115), each ICD being located in one of a plurality of customer premises. For implementing distributed infrastructure for cloud computing, cloud-based application hosting, and/or cloud-based data storage, a computer might establish one or more ICDs 105 of the plurality of ICDs 105 as distributed infrastructure elements and might provide at least one of one or more software applications, customer data, and/or media content to the one or more ICDs 105 for hosting on the one or more ICDs 105. These and other functionalities of the ICDs related to distributed infrastructure are described in greater detail in the Distributed Infrastructure Application (already incorporated by reference herein).

Merely by way of example, in some aspects, a user can remotely access and control one or more ICDs 105 over a network. For example, in a web-based implementation, a user could log into the user's master account by accessing a website hosted on a web server (e.g., web server 125, which might be hosted on a cloud server, hosted on distributed PDDs, hosted on distributed ICDs, and/or the like) and entering commands into a user interface (e.g., user interface 120) associated with access and control of the user's ICD(s) 105. In some instances, the user might access and interact with the user interface over the network (e.g., network 115) by using a user computer selected from a group consisting of a laptop computer, a desktop computer, a tablet computer, a smart phone, a mobile phone, a portable computing device, and/or the like. In an application-based (or "app-based") implementation, the user might interact with a software application (or "app") running on the user's user device, which might include, without limitation, a laptop computer, a desktop computer, a tablet computer, a smart phone, a mobile phone, a portable computing device, and/or the like. The app might include another user interface (similar to the web-based user interface) that might allow for access and control of the user's ICD(s) (or any paired ICD(s)) over the network (e.g., network 115).

In some embodiments, access and control of one or more ICD(s) may be permitted in response to identification and/or authentication of the user by a PDD ("PDD"), as described in detail herein and in the Mobile Presence Detection Application. In some embodiments, a PDD 105 might comprise a second video input interface to receive second video input from a second local content source (which, in some embodiments, might include a STB and/or the like) and a second audio input interface to receive second audio input from the second local content source. PDD 105 might further comprise a second video output interface to provide second video output to a second video display device and a second audio output interface to provide second audio output to a second audio receiver. In some cases (as with ICD 105 above), the second video display device and the second audio receiver might be embodied in the same device (e.g., a TV with built-in speaker system, or the like). With the input and output interfaces, PDD 105 might provide pass-through capability for video and/or audio between the second local content source and the second display device. In some instances, high-definition multimedia interface ("HDMI") cables or other suitable HD signal cables may be used to provide the interconnections for the pass-through. PDD 105 may, in some cases, comprise a second video capture device to capture at least one of second image data or second video data, and a second audio capture device to capture second audio data. PDD 105 might also comprise a second network interface, at least one second processor, and a second storage medium in communication with the at least one second processor. Similar to the ICDs 105, a plurality of PDDs 105 may be communicatively coupled together in a network (e.g., network 115), as distributed infrastructure elements for implementing distributed infrastructure for cloud computing, cloud-based application hosting, and/or cloud-based data storage.

Once a user has been automatically identified and/or authenticated by a user device having identification and/or authentication functionality (e.g., by a PDD as described herein or as described in the Mobile Presence Detection Application), regardless of whether or not the user is associated with (or owns) such user device, the user may be provided with access and control of the ICD(s) over the network. Such access and control (as discussed above) may be in the form of web-based user interfaces, app-based user interfaces, or other suitable user interfaces. Such user interfaces might be customized automatically based on the user preferences (i.e., based on the video capture, processing, and distribution user preferences discussed above). In some instances, the user interfaces might be configured to allow addition, modification, and/or deletion of such user preferences. According to some embodiments, the user interfaces might provide the user with options for uploading, locally storing, cloud storing, distributing/sharing, processing, and/or otherwise handling captured image data and/or video data from the ICD(s). Some of these options may be preselected (or established as default settings) in the user preferences. In some cases, processing of captured image data and/or video data from the ICD(s) might include, without limitation, annotating, sharpening, and/or otherwise manipulating the captured image data and/or video data, and, in some embodiments, might also include generating time-lapse video clips/segments based on the captured image data and/or video data.

In some cases, the user device (e.g., PDD) might be configured to determine whether the user is no longer present. Based on such a determination, access and control of the ICD(s) over the network, as well as access and control over any image data and/or video data captured by said ICD(s) (whether in the raw or processed state), may be blocked. Blocking such access and control may include automatically logging out of the web-based or app-based user interface, or the like.

Figure 2:
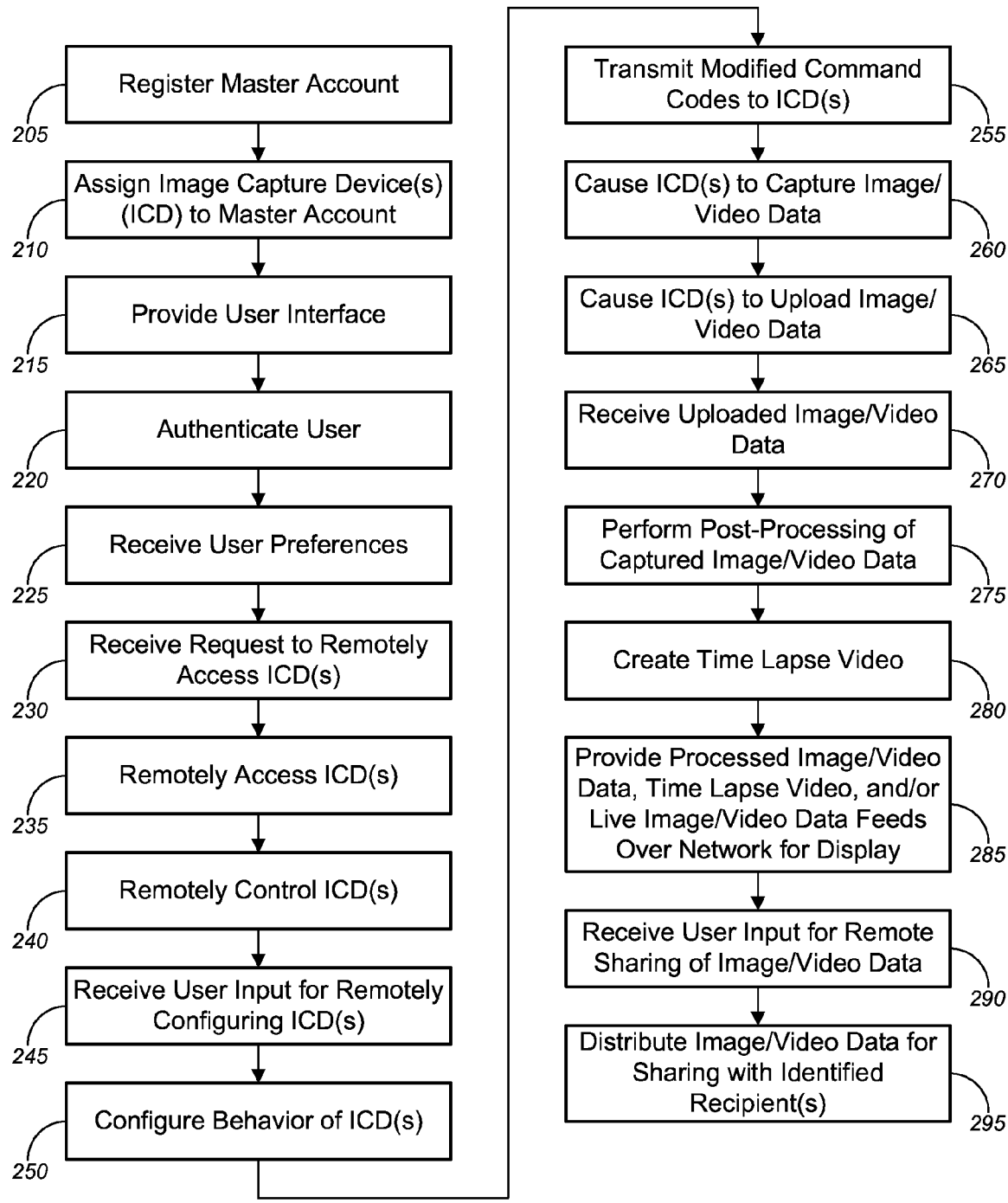
FIG. 2 is a process flow diagram illustrating a method of implementing remote control of image and video capture devices, and for implementing remote control of processing and sharing functions associated with captured image and/or video data, in accordance with various embodiments.

FIG. 2 illustrates a method 200 of implementing remote control of image and video capture devices, and for implementing remote control of processing and sharing functions associated with captured image and/or video data, in accordance with one set of embodiments. While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by (and, in some cases, are described below with respect to) the system 100 of FIG. 1 (or components thereof), such methods may also be implemented using any suitable hardware implementation. Similarly, while the system 100 of FIG. 1 (and/or components thereof) can operate according to the method illustrated by FIG. 2 (e.g., by executing instructions embodied on a computer readable medium), the system 100 can also operate according to other modes of operation and/or perform other suitable procedures.

Turning to FIG. 2, the method 200 might comprise registering a master account for a user (block 205). In accordance with various embodiments, registering a master account for a user can comprise a variety of operations. Merely by way of example, registering a master account can comprise creating a database entry for a particular user and/or assigning authentication credentials to that user; these credentials can be used to access the master account, as described in further detail below.

The method 200 can also include assigning one or more ICDs to the master account (block 210). For instance, the user might identify any ICDs that the user owns (or is otherwise associated with; e.g., members of the user's family might be associated with the devices owned by the user), and the system can assign those ICDs to the user's master account. According to some embodiments, the user's master account might include any suitable number of sub-accounts. In one example, each member of the user's family might be associated with a sub-account linked with the master account. In some instances, the user (or some members of his or her family) might have a work/school sub-account and a home sub-account, the former being associated with profiles and/or media content appropriate for school or work, while the latter being associated with all, or all other, profiles and/or media content. In some embodiments, the master account and the plurality of sub-accounts might be organized as a hierarchy, with the master account (being at the top of the hierarchical structure) having full access to profiles and media content of each sub-account, the sub-accounts at the next level having access to profiles and/or media content of only those sub-accounts that the master account has given access to, and the sub-accounts at lower levels having limited access to profiles and/or media content. For example, the user's master account might have access to all profiles and/or media content associated with the master account and the sub-accounts. The user can provide his or her spouse with a sub-account having the same access to profiles and/or media content, while providing limited access to profiles and/or media content to each of the user's children's sub-account(s). In some instances, the user and/or the user's spouse might impose limits on access to profiles and/or media content for each of their work sub-accounts.

In some cases, each ICD might have an identifier, such as a hardware identifier, IP address, nickname, and/or the like, by which the system can address the ICD, and assigning an ICD to the master account can comprise associating that identifier with the master account. When an ICD is assigned to a master account, the user of that account will be able to access, configure, and/or control the ICD through the control server, for example as described in further detail below. In some cases, the user might own a plurality of ICDs and might wish to control all of the ICDs from a single master account. In an aspect, a user can identify such devices through a user interface to the control server.

In another aspect, as described briefly above, the assignment process can be simplified. When the user first configures an ICD (usually locally, but perhaps over the network), the user can provide credentials to the ICD that associate the device with the master account. Thereafter, the ICD might be configured to communicate with the control server and identify itself using those credentials; at that point, the control server can assign the ICD to the master account, and no credentials need to be stored on the ICD from that point forward (other than perhaps the ICD's own identifying information).

The method 200, in the illustrated embodiment, might further comprise providing a user interface to allow interaction between the user and the control server (block 215). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving, and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic Hypertext Markup Language ("HTML") and/or Asynchronous JavaScript and XML (or extensible markup language) ("AJAX") technologies, to name but a few examples.

In many cases, providing a user interface will comprise providing one or more display screens each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to log on to a master account, access ICDs via the control server, etc.

In an aspect of some embodiments, the user logs onto his or her master account at the control server in order to access and/or control ICDs assigned to that account. Accordingly, at block 220, the method 200 can include authenticating the user with a set of credentials associated with the master account (e.g., with any of several known authentication schemes, such as a userid/password challenge, a certificate exchange process, and/or the like, as well as authentication techniques, described in further detail below, that employ sensors on an ICD, such as facial recognition, voiceprint analysis, gesture-based identification, spoken identifiers, and/or the like). Once the user has been authenticated, the user interface can present the user with a variety of different information, including without limitation information about status of ICDs assigned to the master account to which the user has logged on, options for controlling such ICDs, and/or the like.

Thus, in some aspects, the method 200 might further comprise receiving (e.g., via a network, such as the Internet, to name one example) user preferences (block 225), and in particular user preferences relating to the access and control of ICD(s) and/or access and control of image data and/or video data captured by the ICD(s), including, without limitation, preferences such as those described above.

In some aspects, the method 200 might further comprise receiving (e.g., via a network, such as the Internet, to name one example), a request from the user to (remotely) access an ICD(s) (block 230). In an aspect, the user can request such (remote) access by logging into his or her master account and requesting such access through the user interface. The user interface can provide many different mechanisms to allow the user to request access to an ICD(s). Merely by way of example, the user interface might provide a button or other widget associated with each ICD assigned to the account, and the user can select the button/widget associated with the ICD(s) the user would like control. The user interface then can provide options for different types of control that the user can impose on ICD(s). For instance, the user interface might have a list of commands from which the user can choose, text input fields and/or other widgets to select parameters (such as image resolution, number of images to capture, link the video to capture, time and/or interval at which to capture images/video, and/or the like). Based on these examples, the skilled reader can appreciate that the user interface can provide any number of options to allow the user to control the selected ICD(s).

If the user has assigned multiple ICDs to the master account, the user might be presented with a list of the assigned devices in the user interface, and receiving the user's request for access to one or more ICDs can include receiving a selection in the user interface of the one or more ICDs that the user would like to access. In accordance with some embodiments, the user can access and/or control multiple ICDs at once (as long as those devices are assigned to the same master account). For example, in a security setting, the user might wish to configure multiple security cameras in the same way (e.g., to collect images and or video on a particular interval), and the user interface can allow the user to select all desired cameras and control all of the selected cameras in the same way or in different ways. This functionality can also be used, for example, to update settings in multiple ICDs at the same time, to update firmware and/or software in multiple ICDs at the same time, and/or the like.

In a set of embodiments, the method 200 can include accessing the selected ICD(s) from the control server, over the network (block 235). Accessing an ICD(s) can comprise any operation that establishes communication between the control server and the ICD(s). For instance, as noted above, an ICD(s) often will be identifiable and/or addressable by an identifier, such as an IP address, etc., and accessing the device can comprise communicating with the ICD(s) (using any suitable protocol) at the appropriate IP address. In some cases, the control server will establish a secure connection with the ICD(s). Merely by way of example, in one embodiment, the control server will authenticate the ICD(s), and/or the ICD(s) will authenticate the control server (e.g., using a mutual authentication protocol, such as certificate exchange, and/or the like), and/or the control server will establish an encrypted communication session with the ICD(s) (e.g., using any of a variety of known security techniques, such as secure sockets layer communications, IPSec tunnels, and/or the like).

As noted above, in a set of embodiments, the system can include a software client that can be installed on a computing device that comprises (or is in communication with) an ICD(s). Examples of such ICD(s) can include, without limitation, an onboard camera on a tablet, wireless phone, laptop, etc., and/or a separate USB camera, such as a webcam, to provide a couple of examples. Any number of devices that have a software-controllable camera and supports software installation can serve as such a computing device in accordance with different embodiments. In such embodiments, accessing an ICD(s) can comprise the control server communicating with that software client, which, in turn, can provide the control server with indirect access to the ICD(s) (e.g., by interfacing with the computing device's operating system framework for controlling the ICD(s)).

The method 200 can also include controlling the ICD(s) over the network (block 240), based on the user input received via the user interface. Although the method 200 describes the control operations from the perspective of the control server, it should be appreciated that certain embodiments feature ICDs that operate in response to control by the control server. So, for example, when this document refers to causing an ICD to take some action, the skilled reader will appreciate that certain embodiments include ICDs that perform the described action in response to the control input from the control server.

Controlling the ICD can comprise a variety of operations, and those operations often will depend on what the user has requested. Merely by way of example, in some cases, controlling the ICD can comprise receiving user input for remotely configuring the ICD(s) (block 245). The control server might configure a behavior of the ICD(s), based on the received user input (block 250). Such functionality can include causing the ICD(s) to capture images or video, as described above, but can also include changing an operating parameter of the ICD(s), such as an address (e.g., IP address) or other identifier of the device, changing or assigning a nickname of the device, changing or assigning an avatar image associated with the device, and/or the like.

In some cases, the control server controls the ICD(s) by sending one or more command codes to the ICD(s). These command codes can be used to provide the control described above (such as causing the ICD(s) to capture images, configuring the ICD(s), and/or the like), as well as to provide other commands, such as causing the ICD(s) to perform a network test and/or perform other suitable operations, such as those described above, as well as operations like checking WiFi signal strength, adjusting camera orientation (e.g., pan, tilt) and/or capture (e.g., focal length, white balance) parameters, changing device configuration (e.g., time zone) parameters, restarting the device, and/or the like. In an aspect, the control server and the ICD(s) might share a set of command codes, which both devices understand to represent desired commands, and the method 200 can include modifying the set of command codes and/or transmitting the modified set of codes to the ICD(s) (block 255). This capability can provide for upgradability and/or advanced remote functionality as new features are developed. Similarly, the control server can transmit updated firmware/software to the ICD(s) and/or control the ICD(s) to update its firmware as necessary.

Merely by way of example, in some cases, controlling the ICD(s) can comprise causing the ICD(s) to capture an image and/or a video segment (block 260). Additionally and/or alternatively, controlling the ICD(s) can include, at block 265, causing the ICD(s) to upload the captured image or video segment to the control server and/or to a specified location on the network (which might be specified by the user, e.g., via the user interface, and/or might be specified by the system itself without user input), which might then be received at block 270. In some cases, the specified location might be a cloud storage system, such as that provided by Amazon Web Services™ and/or the like. In an aspect of some embodiments, the system can cause the ICD(s) to upload the image and/or video directly to the cloud environment, without transmitting the image/video to any intermediary server (including the control server itself or any other device), preventing bottlenecks in the upload process. Merely by way of example, the command from the control server might include a URL pointing to a location in the cloud environment to which the image/video should be uploaded.

In a particular set of embodiments, the system might segment the storage environment (whether a cloud storage environment or otherwise) into partitions (e.g., directories, etc.) that are assigned to particular master accounts and/or, within such partitions, subpartitions assigned to individual ICDs assigned to those master accounts. Hence, the method might comprise storing the video/image in a location assigned to that master account and/or ICD(s). In a particular set of embodiments, the system might provide the master account with control over access to the uploaded files, e.g., by allowing the authenticated user to specify whether a given file or set of files should be available only to the user, to others specified by the user, or to the public. In any case, the system might assign a uniform resource locator ("URL") to the uploaded images/video and/or might provide that URL to the user (e.g., via the user interface), so that the user can access the files at a later time, share the URL with others, and/or the like. The URL might be private (e.g., accessible only to the master account) or public (e.g., accessible to anyone, and in particular, to whom the user gives the URL).

In some embodiments, the control server might perform post-processing of captured image/video data (block 275). Post-processing of captured image/video data might include, without limitation, annotating, sharpening, and/or otherwise manipulating the captured image data and/or video data. In some cases, the control server might instruct the ICD(s) to capture images at a specified interval and/or might create a time-lapse video from the captured images (block 280).

According to some aspects, the method, at block 285, can comprise providing one or more of the processed image/video data, the captured image/video data, the time lapse video, and/or live image/video data feeds over the network for display (e.g., on a display device of a user computing device associated with the user, and/or the like). For example, the method might include displaying the processed image/video segment, the captured image/video data, the time lapse video, and/or the live image/video segment via the user interface. For example, a web page that provides the user interface might include a frame, window, or applet that displays an image or video segment uploaded from the ICD(s). In a particular aspect, the control server might obtain the image/video from the location to which the ICD(s) uploaded the image/segment, and/or the control server (and/or web server) might insert into the web page an anchor that references the image/video in another location (such as a location in a cloud storage system where the image/video was uploaded). In an embodiment in which the system causes the ICD(s) to capture a plurality of images, the system might refresh the user interface to display each image as it is uploaded.

In one aspect, method 200 might further comprise, at block 290, receiving user input from the user for remote sharing of selected image/video data (including, without limitation, one or more of the processed image/video data, the captured image/video data, the time lapse video, and/or the live image/video data feeds, etc.). In some instances, a user interface (either web-based or app-based user interface, which might be the same (or different) from the user interfaces described above) might be used to receive said user input. At block 295, method 200 might further comprise distributing the selected image/video data to identified recipients for sharing with these identified recipients.

The amount of control imposed by the control server can vary according to embodiment and implementation. Merely by way of example, as noted above, in some embodiments, there might be no control server, and the ICD(s) might incorporate all the functionality described herein with regard to the control server, including peer-to-peer functionality with other ICDs. In other embodiments, the control server might provide fairly fine-grained control over the ICD(s), such as instructing the camera to capture images for purposes of determining presence, and/or the control server may receive the images directly and perform the presence determination, identification, and/or authentication procedures at the controls server. The division of responsibility between the control server and the ICD(s) can fall anywhere along this spectrum. In some cases, for instance, the control server might provide the user preferences to the ICD(s), which then is responsible for collecting presence information in accordance with those preferences and transmitting the presence information to the control server, which takes the appropriate action in response to the presence information, such as, selecting an advertisement based on the presence information. Alternatively and/or additionally, the ICD(s) itself might be responsible for taking such actions.

Figure 3:
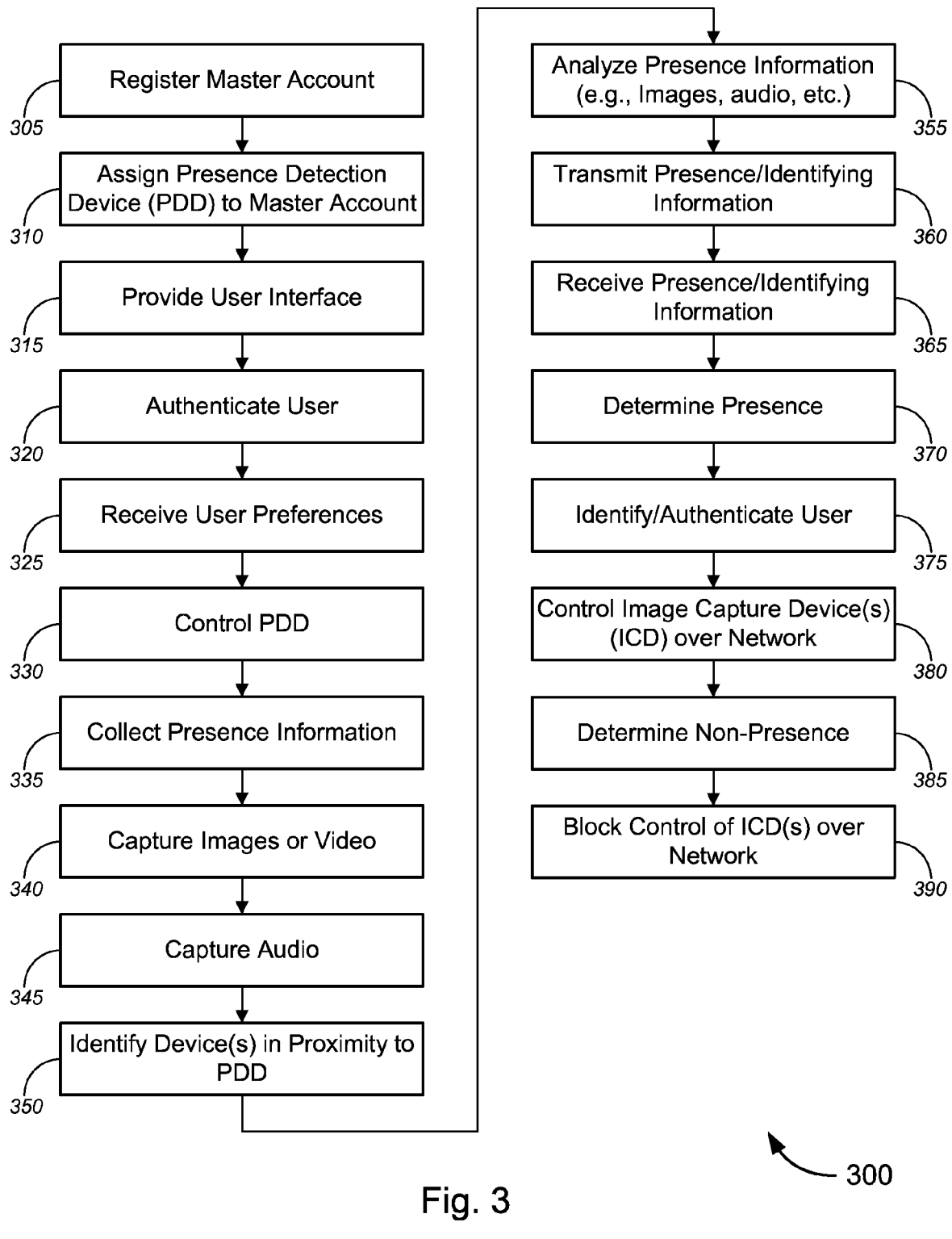
FIG. 3 illustrates a method of collecting and using presence information, in accordance with various embodiments.

FIG. 3 illustrates a method 300 of collecting and using presence information, in accordance with one set of embodiments. While the techniques and procedures are depicted and/or described in a certain order for purposes of illustration, it should be appreciated that certain procedures may be reordered and/or omitted within the scope of various embodiments. Moreover, while the method illustrated by FIG. 3 can be implemented by (and, in some cases, are described below with respect to) the system 100 of FIG. 1 (or components thereof), such methods may also be implemented using any suitable hardware implementation. Similarly, while the system 100 of FIG. 1 (and/or components thereof) can operate according to the method illustrated by FIG. 3 (e.g., by executing instructions embodied on a computer readable medium), the system 100 can also operate according to other modes of operation and/or perform other suitable procedures.

Turning to FIG. 3, the method 300 might comprise registering a master account for a user (block 305). This master account may be the same master account as the master account described in block 205, or may be a different master account. In accordance with various embodiments, registering a master account for a user can comprise a variety of operations. Merely by way of example, registering a master account can comprise creating a database entry for a particular user and/or assigning authentication credentials to that user; these credentials can be used to access the master account, as described in further detail below.

The method 300 can also include assigning one or more PDDs ("PDDs") to the master account (block 310). As discussed above, the one or more PDDs can be embodied by a video calling device, such as any of the VCDs described in the '182 patent, a laptop computer, a desktop computer, a mobile phone, a smart phone, a tablet computer, a video game console, and/or a streaming media player, to name a few non-limiting examples. For instance, the user might identify any PDDs that the user owns (or is otherwise associated with; e.g., members of the user's family might be associated with the devices owned by the user), and the system can assign those PDDs to the user's master account. According to some embodiments, the user's master account might include any suitable number of sub-accounts. In one example, each member of the user's family might be associated with a sub-account linked with the master account. In some instances, the user (or some members of his or her family) might have a work/school sub-account and a home sub-account, the former being associated with profiles and/or media content appropriate for school or work, while the latter being associated with all, or all other, profiles and/or media content. In some embodiments, the master account and the plurality of sub-accounts might be organized as a hierarchy, with the master account (being at the top of the hierarchical structure) having full access to profiles and media content of each sub-account, the sub-accounts at the next level having access to profiles and/or media content of only those sub-accounts that the master account has given access to, and the sub-accounts at lower levels having limited access to profiles and/or media content. For example, the user's master account might have access to all profiles and/or media content associated with the master account and the sub-accounts. The user can provide his or her spouse with a sub-account having the same access to profiles and/or media content, while providing limited access to profiles and/or media content to each of the user's children's sub-account(s). In some instances, the user and/or the user's spouse might impose limits on access to profiles and/or media content for each of their work sub-accounts.

In some cases, each PDD might have an identifier, such as a hardware identifier, IP address, nickname, and/or the like, by which the system can address the PDD, and assigning a PDD to the master account can comprise associating that identifier with the master account. When a PDD is assigned to a master account, the user of that account will be able to access, configure, and/or control the PDD through the control server, for example as described in further detail below. In some cases, the user might own a plurality of PDDs and might wish to control all of the PDDs from a single master account. In an aspect, a user can identify such devices through a user interface to the control server.

In another aspect, as described briefly above, the assignment process can be simplified. When the user first configures a PDD (usually locally, but perhaps over the network), the user can provide credentials to the PDD that associate the device with the master account. Thereafter, the PDD might be configured to communicate with the control server and identify itself using those credentials; at that point, the control server can assign the PDD to the master account, and no credentials need to be stored on the PDD from that point forward (other than perhaps the PDD's own identifying information).

Hence, the method 300, in the illustrated embodiment, might further comprise providing a user interface to allow interaction between the user and the control server (block 315). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving, and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic Hypertext Markup Language ("HTML") and/or Asynchronous JavaScript and XML (or extensible markup language) ("AJAX") technologies, to name but a few examples.

In many cases, providing a user interface will comprise providing one or more display screens each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to log on to a master account, access PDDs via the control server, etc.

In an aspect of some embodiments, the user logs onto his or her master account at the control server in order to access and/or control PDDs assigned to that account. Accordingly, at block 320, the method 300 can include authenticating the user with a set of credentials associated with the master account (e.g., with any of several known authentication schemes, such as a userid/password challenge, a certificate exchange process, and/or the like, as well as authentication techniques, described in further detail below, that employ sensors on a PDD, such as facial recognition, voiceprint analysis, gesture-based identification, spoken identifiers, and/or the like). Once the user has been authenticated, the user interface can present the user with a variety of different information, including without limitation information about status of PDDs assigned to the master account to which the user has logged on, options for controlling such PDDs, and/or the like.

Thus, in some aspects, the method 300 might further comprise receiving (e.g., via a network, such as the Internet, to name one example) user preferences (block 325), and in particular user preferences relating to the collection and/or use of presence information, including without limitation preferences such as those described above. The method 300, then, can further include controlling and/or configuring the PDD, in some cases based at least in part on the user preferences (block 330). Merely by way of example, the user might have specified in the user preferences that the PDD should not be used to collect presence information at all, in which case that feature might be turned off at the PDD. In the case that the user preferences indicate that presence information should be turned off (e.g., privacy settings may be set high, either permanently or temporarily, and/or with respect to certain user-established and/or preset conditions, or the like), some embodiments might establish a blocking feature for the user when other PDDs send presence information for comparison matching processes with database user biometrics, the effect of which being that no match can be made, and thus the user's profiles and/or media content (and/or access thereto) is not ported to the other PDDs. Alternatively and/or additionally, the user might have specified some limitations on the collection of presence information (such as about whom such information may be collected, times at which information can be collected, and/or purposes for which information may be collected, to name a few examples). Of course, in some embodiments, these preferences can be set directly at the PDD, e.g., through a menu system displayed on a video device. It should also be recognized that some preferences (such as with whom presence information can be shared) might not affect the PDD and might be saved and/or operated on at the control server instead.

The amount of control imposed by the control server can vary according to embodiment and implementation. Merely by way of example, as noted above, in some embodiments, there might be no control server, and the PDD might incorporate all the functionality described herein with regard to the control server, including peer-to-peer functionality with other PDDs. In other embodiments, the control server might provide fairly fine-grained control over the PDD, such as instructing the camera to capture images for purposes of determining presence, and/or the control server may receive the images directly and perform the presence determination, identification, and/or authentication procedures at the control server. The division of responsibility between the control server and the PDD can fall anywhere along this spectrum. In some cases, for instance, the control server might provide the user preferences to the PDD, which then is responsible for collecting presence information in accordance with those preferences and transmitting the presence information to the control server, which takes the appropriate action in response to the presence information, such as, selecting an advertisement based on the presence information. Alternatively and/or additionally, the PDD itself might be responsible for taking such actions.

At block 335, the method 300 can comprise collecting presence information. A variety of operations might be involved in the collection of presence information. For example, in some cases, the PDD captures one or more images of at least a portion of a room where it is located and/or of a user present in the room (block 340). Such images can be digital still images, a digital video stream, and/or the like. In other cases, the method can include capturing audio samples (block 345), identifying devices in proximity to the capturing device (block 350), and/or the like (for example as described above).

The method 300 can further comprise analyzing one or more of the collected presence information (block 355), including one or more of the images, video samples, audio samples, etc. Merely by way of example, the images and/or video samples might be analyzed with facial recognition software and/or other biometric/physiological recognition software, which can be used to determine the number of people in the room with the PDD and/or to identify any of such people (e.g., by determining a name, an age range, a gender, and/or other identifying or demographic information about a user, based on the output of the facial recognition software and/or other biometric/physiological recognition software). Alternatively and/or additionally, analyzing the images can comprise determining that a person is watching a display device, for example using eye-tracking software to identify a focus area of the person's eyes and correlating that focus area with the location on a screen or display of a television (or other suitable display device). In some cases, if the number of people and the identities (or at least demographic characteristics) of each of the people in the room can be determined, analyzing the images can further include determining a collective demographic of the people in the room (based, for example, on the demographic characteristics of a majority of people in the room). In further cases, the method might analyze audio samples using voiceprint analysis, compare user responses to stored challenge/response information, and/or the like. As yet another example, a camera of a PDD might capture user gestures, which can be compared with stored gestures (e.g., a particular pattern of hand waving, a pattern of fingers displayed by the user, etc.) in a gesture-based identification and/or authentication scheme. It should be noted that many embodiments can use various combinations of such techniques (such as a combination of facial analysis and spoken, gestured, or typed identifiers, to name a few examples) to provide two-factor authentication.

Such analysis can be performed at the PDD and/or at the control server. Accordingly, in some embodiments, the PDD will transmit presence information or other identifying information that can be used (in part or in whole) for identifying the user. Such identifying information can include raw or analyzed presence information, as well as information derived from the presence information, such as, to name some examples, extracted features from an image, audio segment, and/or video segment; an excerpted image, video, and/or audio segment; and/or the like. Such presence information and/or identifying information can be transmitted from the PDD to the control server (block 360), although as noted above, this is not necessary in some embodiments (e.g., where identifying the user or other analysis is performed at the PDD). Such transmission might comprise IP communications over the Internet, (perhaps over a secure channel, such as a virtual private network ("VPN")), and, as noted above, the presence/identifying information can include a wide variety of different types of information that enable the control server to determine presence and/or identify/authenticate a user. Hence, at block 365, the control server (in a cloud-based presence detection scheme) might receive the transmitted presence information. In the case that raw presence information is received by the control server, the control server might analyze the raw presence information in a similar manner as described above at block 355. At block 370, the method 300 comprises detecting and/or determining presence of a user. This determination can be made by the PDD and/or by the control server. In one case, for example, the PDD might transmit raw video segments, raw images, raw audio samples, etc. to the server, which might perform all analysis and presence determination. In another case, the PDD might perform this analysis and might notify the control server that a user is present. Receiving such a notification at the control server can be considered to be the control server detecting presence of a user.

At block 375, the method 300 can include identifying and/or authenticating a user. In some cases, this identification and/or authentication can be implicit in the operation of detecting user presence. For example, in performing facial recognition to detect that a user is present, the PDD (and/or control server) might further analyze the same image to determine an identity of the present user. Alternatively, however, detection of user presence and identification/authentication of the user might be performed as discrete steps (and might depend on device capabilities). For example, a PDD might have sufficient capabilities to detect the presence of the user, and if so, might send identifying information (such as a captured image, video sample, audio sample, etc.) to the control server to actually identify the user. Alternatively, the PDD might be capable of identifying the user on its own and might merely send the identity of the user (i.e., data identifying the user, such as a name, username, etc.) to the server.

In some instances, the PDD and/or the control server (i.e., in a cloud-based presence scheme) might have access to the user's profile or other personal information of the user (including, without limitation, communications, calendar items, contacts list, travel/itinerary information, IP address of user's PDD(s), or the like). Such profile or other personal information might indicate that the user is visiting a friend or relative in a different city, state, or country. In the case that the friend or family member has a similar PDD linked to a common network with the control server or other PDDs (i.e., in a peer-to-peer or distributed computing scheme), the user's PDD and/or the control server (if present) might facilitate identification and/or authentication of the user at the friend's or relative's PDD ("other PDD"), by, for example, sending the user's biometric/physiological information to the other PDD and/or to a data center local to the other PDD, so as to reduce comparison/matching times for identification/authentication of the user at the other PDD. Such proactive autonomous facilitation functionality might, in some cases, be subject to the user's selection of such option in the user preferences (e.g., at block 325 above). In some cases, the user might disable and/or limit such functionality (e.g., for privacy reasons, for security reasons, and/or the like). In some embodiments, the IP address of a PDD at which a user attempts to log in might be analyzed to determine the city in which the PDD is located. If the city (or neighborhood or customer premises) of the last PDD at which the user logged in (or is otherwise authenticated by) is determined to be different from the city (or neighborhood or customer premises) of the current PDD, then it can be inferred that the user has moved, or is travelling. Such inference may be used, in some embodiments, to further infer a general direction in which the user is travelling (or to infer a potential destination(s), if sufficient numbers of data points/locations are determined), and can be used to send ahead the user's profile and/or content to control servers and/or PDDs that are at or near the determined potential destination(s).

Once the present user has been identified and/or authenticated, the control server (and/or the PDD at which the user is present) might control the ICD(s) ("ICD(s)") over the network (block 380), in accordance with any or all of the processes in blocks 205-290, as described in detail above with respect to FIG. 2.

Alternatively, in some embodiments, the PDD and the ICD might be the same user device, in which case, the ICD might detect presence of a user (as described in detail above with respect to the PDD), and might notify a computer about the detected presence of a user. Such an ICD might then receive, over a network, control instructions from the computer to capture image data or video data of the user, based on the detected presence of the user, and might control the ICD, based at least in part on the control instructions received from the computer over the network. In a non-limiting example, a parent might desire retaining parental controls over a gaming console. So, in the case that the parent is in his or her bedroom (or out of town on a business trip, for example), a child who sneaks into the living room/game room to play a game on the gaming console might trigger detection of the child's presence, which might trigger a notification message to the parent (e.g., an e-mail message, text message, and/or the like) on the parent's mobile device (including, without limitation, smart phone, mobile phone, portable computer, tablet computer, laptop computer, and/or the like) or on a computing device (including, but not limited to, a laptop computer, a desktop computer, and/or the like). The parent can then send control instructions to the gaming console to take images or videos of the child (and in some cases, to initiate a video chat through the gaming console to tell the child to go to bed, and/or the like). The parent can thus remotely monitor the child through the video capture functionality of the gaming console to ensure that the child does go to bed (or at least leaves the living room/game room), regardless of whether the child turns off the video capture functionality of the gaming console (i.e., the parent can override the child's controls of at least the video capture feature of the gaming console, etc.). The parent, in some cases, can even remotely turn off the gaming function of the gaming console, and watch as the frustrated child returns to bed. In this example, the transmission of the control instructions to the ICD (in this case, gaming console) can be peer-to-peer from the parent's user device (which can include, e.g., a second ICD or second PDD, or any of the mobile or computing devices discussed above, and/or the like), or it can be via a central or control server over the network.

In some embodiments, the method 300 might further comprise determining that a user is no longer present at the PDD (block 385). For example, as noted above, the system might continuously and/or periodically capture images and perform presence determination techniques (e.g., as described above) to determine whether the user is still present, and/or might actively query the user after some period of time to determine whether the user is still present. If the system determines that the user is no longer present, the system can block remote access (and control) of the ICD(s) from the PDD over the network (block 385); for example, the system might delete any image or video content transmitted from the ICD(s) to the device, log out of any services for controlling the ICD(s) that the system had logged into from the PDD, revoke access to image and/or video content captured by the ICD(s) (and/or post-processed using raw captured image data or raw captured video data from the ICD(s)) stored in the cloud, and/or the like. This functionality is particularly useful and applicable to PDDs (or other devices) that are neither owned nor associated with the user (e.g., a friend's or relative's device, devices at a vacation hotel or vacation rental property, etc.). Such determination and content/access removal might, in some instances, be based on a time-out system (e.g., 5, 15, 30, or 60 minutes, etc.), in which the system might account for the user's temporary absence from the room, while protecting the access to profiles (with which accessing and control of the ICD(s) may be associated) and/or content. In some cases, the user can select specific time-out periods, which can be stored in the user's profile, and such specific time-out periods can be universally applicable to some or all profiles, some or all media content, or some or all profiles and media content, or can be specific to particular profiles and/or media content. In some cases, user profiles might be associated with a much shorter time-out period (a time between 1-5 minutes) compared with media content (which might have a time-out period ranging from 15 minutes to 3 hours, or the like). The time-out system might be based on a counter or clock system that starts counting from the last time the system recognized that the user was in range of any of the sensors of the PDD. Any suitable techniques other than the time-out system described above may be implemented as appropriate.

The reader should note that a wide variety of presence-based functions (including without limitation those described in the Related Applications) can be performed by the system in conjunction with various techniques described as part of the methods 200 and/or 300, and that such functions can be combined in any suitable way. Merely by way of example, the '603 Application described advertising techniques that can be implemented based on detected presence, and such techniques can be integrated with various techniques described as part of the method 200 and/or method 300. For instance, the system (e.g., the control server, the PDD, the ICD, etc.) might obtain relevant advertising material as described in the '603 Application and display such advertising over content obtained and delivered using the techniques of the method 200 and/or method 300. Based on this disclosure, the skilled reader will understand that such techniques can be combined in a number of different ways.

Figure 4:
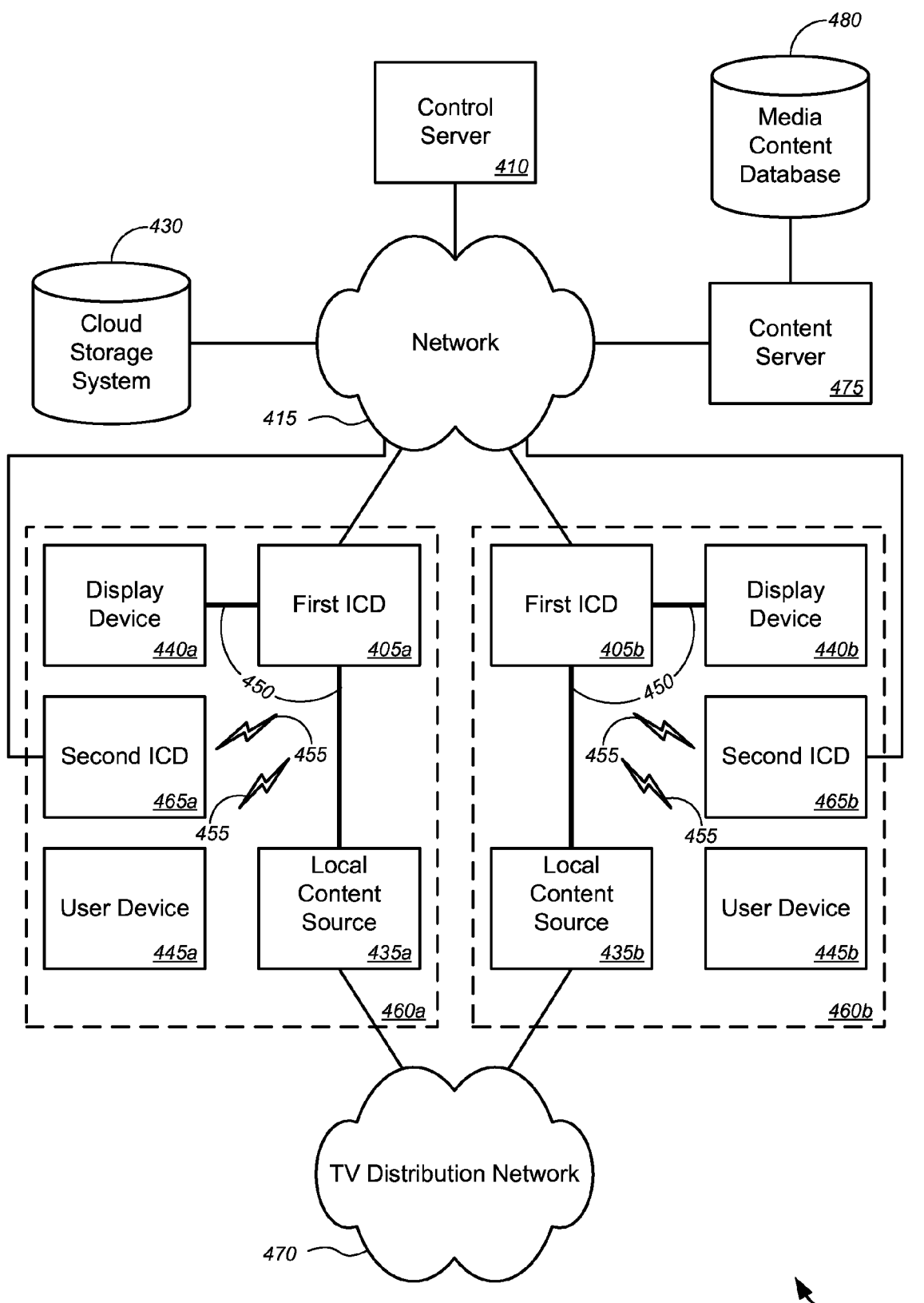
FIG. 4 is a block diagram illustrating another system for implementing remote control of image and video capture devices, and for implementing remote control of processing and sharing functions associated with captured image and/or video data, in accordance with various embodiments.

FIG. 4 illustrates a functional diagram of a system 400 for controlling one or more first ICDs 405 (which can be considered a type of user device 105). The skilled reader should note that the arrangement of the components illustrated in FIG. 4 is functional in nature, and that various embodiments can employ a variety of different structural architectures. Merely by way of example, one exemplary, generalized architecture for the system 400 is described below with respect to FIG. 6, but any number of suitable hardware arrangements can be employed in accordance with different embodiments.

In FIG. 4, a first ICD 405 might correspond to ICD 105 and/or PDD 105, while user device 445 might correspond to non-ICD or non-PDD user device 105, as described in detail above with respect to FIG. 1. Control server 410, network 415, and cloud storage system 430, in the example of FIG. 4, might correspond to control server 110, network 115, and cloud storage system 130, respectively, as described in detail above with respect to FIG. 1.

System 400 might further comprise a local content source 435 (e.g., a local content source as described above), a display device 440 (including, without limitation, a television ("TV")), and high-definition ("HD") data cables 450 (or any other suitable data transmission media). In some cases, the HD data cables 450 might include, without limitation, high-definition multimedia interface ("HDMI") cables. One or more of the first ICDs 405, as shown in FIG. 4, might be configured to provide pass-through audio and/or video from a local content source 435 to a display device 440 (e.g., using data cables 450). Merely by way of example, in some embodiments, an HDMI input port in the first ICD 405 allows HD signals to be input from the corresponding local content source 435, and an HDMI output port in the first ICD 405 allows HD signals to be output from the first ICD 405 to the corresponding display device 440 (e.g., TV, which might include, but is not limited to, an Internet Protocol TV ("IPTV"), an HDTV, a cable TV, or the like). The output HD signal may, in some cases, be the input HD signal modified by the first ICD 405. Local content source 435 might be any suitable local content source. An noted above, a local content source can be any device that provides an audio or video stream to a display device and thus can include, without limitation, a cable or satellite STB, an IPTV STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. Hence, when situated functionally inline between a local content source and a display device, the first ICD 405 can receive an audiovisual stream output from the local content source, modify that audiovisual stream in accordance with the methods described in the '182 patent, and provide the (perhaps modified) audiovisual stream as input to the display device 440. In some embodiments, first ICD 405*a*, local content source 435*a*, display device 440*a*, and user device 445*a* (if any) might be located at a first customer premises 460*a*, while first ICD 405*b*, local content source 435*b*, display device 440*b*, and user device 445*b* (if any) might be located at a second customer premises 460*b*.

According to some embodiments, system 400 might further comprise one or more access points (not shown), each of which might be located in proximity to or in the first customer premises 460*a* and/or the second customer premises 460*b*. The access point(s) can allow wireless communication between each first ICD 405 and network 415. (Of course, a first ICD 405 might also have a wired connection to an access point, router, residential gateway, etc., such as via an Ethernet cable, which can provide similar communication functionality) In some cases (as shown), each first ICD 405 might be communicatively coupled to network 415 (via either wired or wireless connection), without routing through any access points. In some cases, wired or wireless access to network 415 allows first ICD 405 to obtain profiles from cloud storage system 430 and/or media content from content server 475 and media content database 480 independent of the corresponding local content source 435, which is in communication with a television ("TV") distribution network 470 (either via wireless connection or via wired connection). In some cases (not shown), TV distribution network 470 (which could be, for example, a cable television distribution network, a satellite television distribution network, an Internet Protocol television ("IPTV") distribution network, and/or the like) might be communicatively coupled with content server 475, and thus local content source 435 might obtain media content from content server 475 and media content database 480 independently of ICD 405. Alternatively or in addition, the television distribution network 470 might be communicatively coupled to other content servers and/or other media content sources (not shown).

In this manner, first ICD 405 can overlay the input signal from the corresponding local content source 435 with additional media content to produce an augmented output HD signal to the corresponding display device 440 via data cables 450. This functionality allows for supplemental content (which may be associated with the media content accessed by the local content source 435 for display on display device 440) to be accessed and presented using the first ICD 405, in some cases, as a combined presentation on the display device 440, which may be one of an overlay arrangement (e.g., a picture-in-picture ("PIP") display, with the supplemental content overlaid on the main content), a split screen arrangement (with the supplemental content adjacent to, but not obscuring any portion of the main content), a passive banner stream (with non-interactive supplemental content streaming in a banner(s) along one or more of a top, bottom, left, or right edge of a display field in which the main content is displayed on display device 440), and/or an interactive banner stream (with interactive supplemental content streaming in a banner(s) along one or more of a top, bottom, left, or right edge of a display field in which the main content is displayed on display device 440). Herein, examples of interactive supplemental content might include, without limitation, content that when streamed in a banner can be caused to slow, stop, and/or replay within the banner, in response to user interaction with the content and/or the banner (as opposed to passive banner streaming, in which information is streamed in a manner uncontrollable by the user). The interactive supplemental content that is streamed in the banner may, in some instances, also allow the user to invoke operations or functions by interacting therewith; for example, by the user highlighting and/or selecting the supplemental content (e.g., an icon or still photograph of a character, actor/actress, scene, etc. associated with the main content), links for related webpages, links to further content stored in media content database 480, or operations to display related content on display device 440 and/or user device 445 may be invoked.

In some instances, first ICD 405 might detect the presence and/or proximity of one or more user devices 445 associated with the user, and might (based on user profile information associated with the user that is stored, e.g., in cloud storage system 430) automatically send supplemental media content via wireless link 455 (directly from first ICD 405 or indirectly via an access point (not shown)) for display on a display screen(s) of the one or more user devices 445. In one non-limiting example, a user associated with first ICD 405*a* might have established a user profile stored in cloud storage system 430 that indicates a user preference for any and all supplemental content for movies and television programs to be compiled and displayed on one or more user devices 445*a* (including, but not limited to, a tablet computer, a smart phone, a laptop computer, and/or a desktop computer, etc.) concurrent to display of the movie or television program being displayed on display device 440*a*. In such a case, when a movie is playing on display device 440*a* broadcast or streamed via local content source 435*a* from content server 470 and media content database 475 (and/or from some other content server and some other media content source) via network 470, first ICD 405*a* accesses supplemental content (if available) from content server 470 and media content database 475 via network 415, and sends the supplemental content to the users tablet computer and/or smart phone via wireless link(s) 455. For example, bios of actors, actresses, and/or crew might be sent to the user's smart phone for display on the screen thereof, while schematics of machines, weapons, robots, tools, etc. associated with the movie or television show might be sent to and displayed on the user's tablet computer, behind the scenes videos or information, news/reviews associated with the main content, and/or music videos associated with the main content may also be sent to the user's smart phone and/or tablet computer, and so on.

In some embodiments, system 400 might further comprise one or more second ICDs 465 (including second ICD 465a and second ICD 465b, which might be located in customer premises 460a and 460b, respectively). The one or more second ICDs 465 might have functionality similar to ICD 105 and/or PDD 105, but may or may not necessarily possess pass-through capability between a display device and a local content source, as described above.

In some embodiments, gaming may be enhanced by the functionality described above. For example, a role-player game ("RPG") may be enhanced by supplemental content (including, but not limited to, player statistics, buy/sell/upgrade options for tools and weapons, communications with other in-game characters and/or live friends playing the game, etc.) may be routed through the user's smart phone, tablet computer, or other suitable user device, while the user is playing the RPG via the local content source/game console 440 and the display device 445. In some cases, the video game (in this case, an RPG) could be played on the ICD, which, as noted above, can be embodied by a video game console. This allows for player multitasking without taking away from the gameplay on the main display screen (i.e., the display device 440). For a first-person shooter game, similar multitasking functionality may be achieved. Cooperative game play may also be achieved using the functionality described above. In a non-limiting example, the user might control the shooting and the direct interactions with elements in the game using the main controls of the local content source/game console 435, while a friend uses the tablet computer (for example) to buy/sell/upgrade equipment and weapons, to communicate with other characters and/or players, to keep track of enemies, or the like. In an example of a jet fighter, tank, and/or space ship shooter game, or the like, the user might control the flight and weapons as displayed on display device 440, while the friend(s) keeps an eye on radar, lidar, sonar, or other sensor readings of enemy craft, handles status checks of weapons and ammunition, takes care of maintenance and repairs, and/or establishes communications with in-game characters and/or players as displayed on one or more user device 445. These are merely some examples of the myriad arrays of possibilities enabled by the functionalities described above, and thus are limited only by the imaginations of game developers and players for enhancing multiplayer/multitasking game play.

According to some embodiments, the detection of the presence of the user device 445 by the first ICD 405 might allow identification of a user and thus access of profiles and/or content associated with the user's account, regardless of whether the first ICD 405 is owned by and/or associated with the user. Herein, the user's media content might include, without limitation, at least one of purchased video content, purchased audio content, purchased video game, purchased image content, rented video content, rented audio content, rented video game, rented image content, user-generated video content, user-generated audio content, user-generated video game content, user generated image content, and/or free media content, while the user's profiles might include, but is not limited to, one or more of user profile information for a video game or video game console, web browser history and/or bookmarks, contact information for the user's contacts, user profile information for video or audio content, including without limitation recommended content, device preferences, user profile information for cloud services, and/or the like. In some cases, the user's profile might also include identifying information—including, but not limited to, the user's biometric information (e.g., facial characteristics, voice characteristics, fingerprint characteristics, iris characteristics, pupil characteristics, retinal characteristics, etc.), or the like. In some examples, the user profile information for cloud services might include user log-in information (e.g., username, account number, and/or password/passphrase, etc.) or other suitable credentials for cloud services, which might include, without limitation, video calling service, voice calling service, video broadcast/streaming service, audio broadcast/streaming service, on-line gaming service, banking/financial services, travel/accommodation/rental vehicle services, and/or dining/entertainment event reservation/ticketing services, or the like.

In one example, a user might be associated with first ICD 405a (located in the first customer premises 460a), while her friend might be associated with first ICD 405b (located in the second customer premises 460b), and the user and the friend are both subscribers of a similar service provided by control server 410 and/or the cloud service provider associated with control server 410. When the user visits her friend, the friend's first ICD 405b might first detect presence of the user, by querying and/or obtaining the identification information for the user's smart phone and/or tablet computer or the like, by capturing video, image, and/or voice data of the user, by infrared detection of a living person in the room, and/or by audio detection of a living person in the room, etc. The friend's first ICD 405b might then identify the user using the user's device(s) identification information and/or the captured video, image, and/or voice data, or might send such presence information to control server 410 for identification and authentication analysis. In some cases, detecting presence of, or identifying/authenticating, the user might include, without limitation, analyzing captured images or video segments using one or more of facial recognition software, pupil/iris recognition software, retinal identification software, fingerprint analysis software, and/or physiology recognition software, analyzing captured audio samples using one or more of voiceprint analysis and/or comparison with stored challenge/response information, and/or identification of a user device owned by and/or associated with the user (e.g., based on identification information of the device, which may be previously associated with the user or the user's profile(s), etc.). In terms of detection of the presence of the user's device, any suitable technique may be implemented including, but not limited to, at least one of detecting a Bluetooth connection of the user device, detecting that the user device is associated with a WiFi access point with which the ICD has associated, and/or communicating with the user device using near field communication ("NFC").

Once the user has been identified and authenticated, control server 410 might send copies of the user's profiles and/or content to first ICD 405b (either from first ICD 405a and/or from cloud storage system 430, or the like), or at least provide the user with access to her profiles and/or content from her friend's first ICD 405b. In some embodiments, the identification and authentication processes might include comparing the user device identification information and/or the captured video, image, and/or voice data against all similar identification data for all users/subscribers of the cloud service that are stored in cloud storage system 430. In some cases, the process might be facilitated where first ICDs 405a and 405b might already be associated with each other (e.g., where the user has previously made a video call from first ICD 405a to her friend on first ICD 405b, where the user might have added the friend to the user's contact list, and/or where the friend might have added the user to the friend's contact list). In other cases, the user's first ICD 405*a* might have access to the user's calendar and/or communications, which might indicate that the user is visiting the friend. The first ICD 405*a* might query control server 410 to determine whether the friend has a first ICD 405*b* associated with the cloud service provider. In this example, the first ICD 405*a* determines that first ICD 405*b* is part of the same service and/or is in communication with control server 410, and based on such determination, first ICD 405*a* (and/or control server 410) might send the user's profiles and/or content to first ICD 405*b*, and/or provide first ICD 405*b* with access to the user's profiles and/or content. In some embodiments, the user's profiles and/or content, or access to profiles and/or content, might be encrypted, and might be released/decrypted upon identification and/or authentication by first ICD 405*b* (and/or by control server 410) when the user is detected by first ICD 405*b*. In this manner, the user's profiles and/or content can follow the user wherever she goes, so long as there is a device (e.g., first ICD) that is associated with the same or affiliate cloud service provider at her destination, and so long as the device can recognize and authenticate the user.

By the same token, if the user is no longer detected by the first ICD 405*b*, either after a predetermined number of prompts or queries for the user and/or after a predetermined period of time (e.g., after a specified number of minutes, hours, days, weeks, months, etc.), first ICD 405*b* (and/or control server 410) might determine that the user is no longer present at the location of first ICD 435*b*. Based on such a determination, first ICD 405*b* and/or control server 410 might remove the user's profiles and/or media content (or access thereto) from first ICD 405*b*. As described above, a time-out system might be utilized. Alternatively, other suitable systems may be used for determining the user is no longer present, and removing the user's profiles and/or media content (or access thereto) from the first ICD 405*b*.

Figure 5:
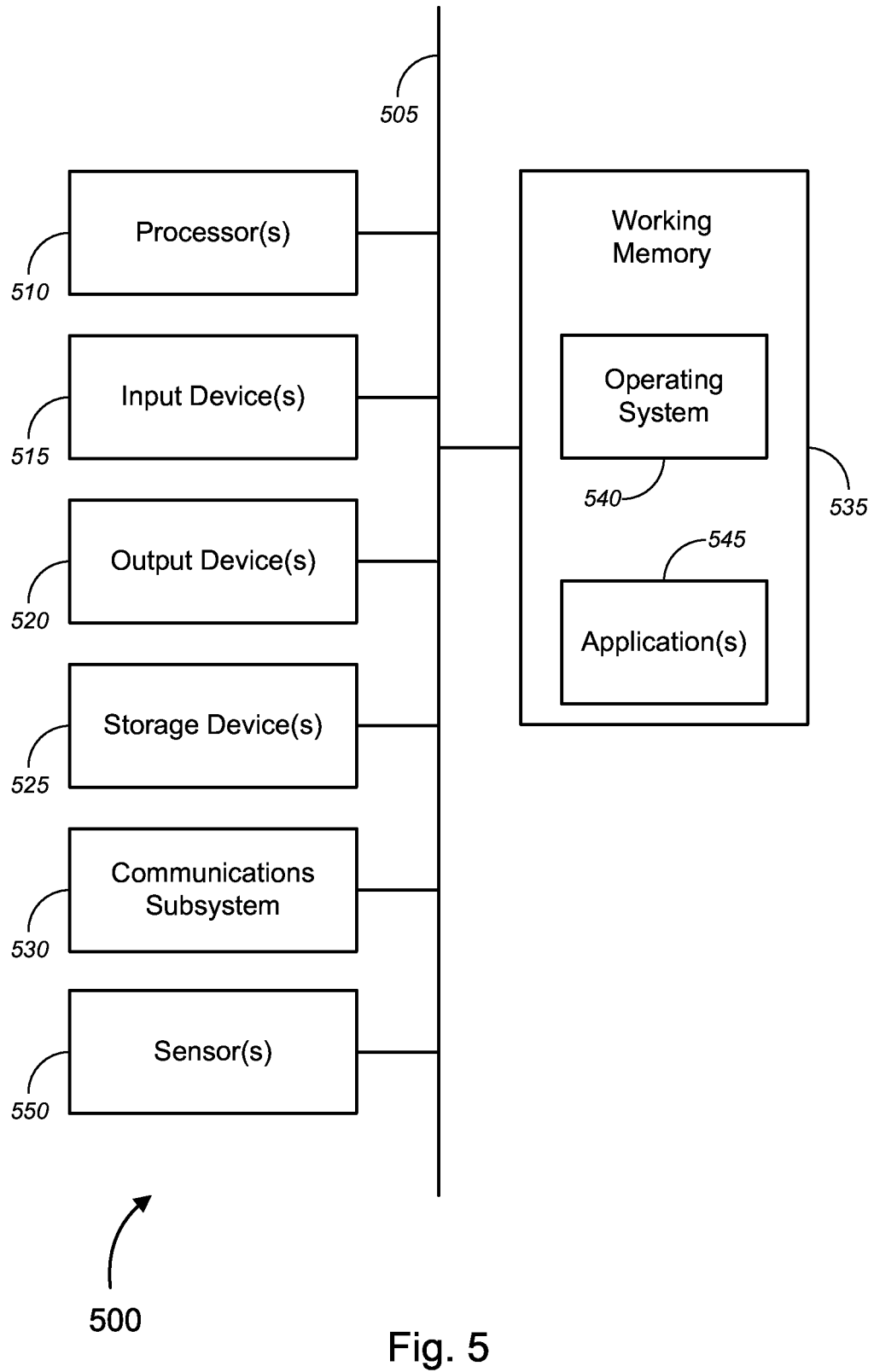
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as an ICD, a PDD, user device, control server, web server, and/or the like. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

According to some embodiments, system 500 might further comprise one or more sensors 550, which might include, without limitation, one or more cameras, one or more IR sensors, and/or one or more 3D sensors, or the like. In some cases, the one or more sensors 550 might be incorporated in (or might otherwise be one of) the input device(s) 515. The output device(s) 520 might, in some embodiments, further include one or more monitors, one or more TVs, and/or one or more display screens, or the like.

The terms "machine readable medium" and "computer readable medium," as used herein, refer to any medium that participates in providing data that causes a machine to operate in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

As noted above, a set of embodiments comprises systems collecting presence information and/or delivering information (including, without limitation, profiles and/or content) to a user on a user device, based on presence information, regardless of whether the user device is owned by and/or associated with the user. FIG. 6 illustrates a schematic diagram of a system 600 that can be used in accordance with one set of embodiments. The system 600 can include one or more user computers 605. In particular, a user computer 605 can be an ICD, a PDD, and/or a user device, as described above. More generally, a user computer 605 can be a general purpose personal computer (including, merely by way of example, desktop computers, workstations, tablet computers, laptop computers, handheld computers, mobile phones, smart phones, and the like), running any appropriate operating system, several of which are available from vendors such as Apple, Microsoft Corp., as well a variety of commercially-available UNIX™ or UNIX-like operating systems. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or of displaying and navigating web pages or other types of electronic documents. Although the exemplary system 600 is shown with two user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including without limitation TCP/IP, SNA™, IPX™, Apple-Talk™, and the like. Merely by way of example, the network 610 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 615. Each of the server computers 615 may be configured with an operating system, including without limitation any of those discussed above with respect to the user computers 605, as well as any commercially (or freely) available server operating systems. Each of the servers 615 may also be running one or more applications, which can be configured to provide services to one or more clients 605 and/or other servers 615.

Merely by way of example, one of the servers 615 might be a control server, with the functionality described above. In another embodiment, one of the servers might be a web server, which can be used, merely by way of example, to provide communication between a user computer 605 and a control server, for example, to process requests for web pages or other electronic documents from user computers 605 and/or to provide user input to the control server. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform operations in accordance with methods provided by various embodiments.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as providing a user interface for a control server, as described above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters. Further, as noted above, the functionality of one or more servers 615 might be implemented by one or more containers or virtual machines operating in a cloud environment and/or a distributed, cloud-like environment based on shared resources of a plurality of user ICDs and/or a plurality of PDDs.

In certain embodiments, the system can include one or more data stores 620. The nature and location of the data stores 620 is discretionary: merely by way of example, one data store 620 might comprise a database 620a that stores information about master accounts, assigned ICDs, etc. Alternatively and/or additionally, a data store 620b might be a cloud storage environment for storing uploaded images and/or video. As the skilled reader can appreciate, the database 620a and the cloud storage environment 620b might be collocated and/or separate from one another. Some or all of the data stores 620 might reside on a storage medium local to (and/or resident in) a server 616a. Conversely, any of the data stores 620 (and especially the cloud storage environment 620b) might be remote from any or all of the computers 605, 615, so long as it can be in communication (e.g., via the network 610) with one or more of these. In a particular set of embodiments, a database 620a can reside in a storage-area network ("SAN") familiar to those skilled in the art, and/or the cloud storage environment 620b might comprise one or more SANs. (Likewise, any necessary files for performing the functions attributed to the computers 605, 615 can be stored locally on the respective computer and/or remotely, as appropriate.) In one set of embodiments, the database 620a can be a relational database, such as an Oracle database, that is adapted to store, update, and retrieve data in response to SQL-formatted commands. The database might be controlled and/or maintained by a database server, as described above, for example.

As noted above, the system can also include one or more first ICD ("ICDs") 625 and one or more second ICDs 630. Although only one of each such devices are illustrated in FIG. 5, it should be appreciated that any number of first ICDs 625 and any number of second ICDs 630 can be controlled in accordance with various embodiments. Using the techniques described herein, a control server 615 can control the operation of the first ICD(s) 625 and/or the second ICD(s) 630 e.g., by performing operations in accordance with the methods described above. Each of the first ICDs 625 and/or the second ICDs 630 may be (or may have similar functionality as) an ICD 105 or a PDD 105, as described in detail above; in some cases, each of the first ICDs 625 and/or the second ICDs 630 might be (or may have similar functionality as) a VCD as described in the '182 patent.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of remotely accessing and controlling an image capture device, the method comprising:
   receiving, at a first computer, user input from a first user;
   controlling, with the first computer, one or more first image capture devices over a network, based on the user input received from the first user, the one or more first image capture devices being located at a first customer premises associated with the first user, each of the one or more first image capture devices comprising:
      a first video input interface to receive first video input from a first local content source;
      a first audio input interface to receive first audio input from the first local content source;
      a first video output interface to provide first video output to a first video display device;
      a first audio output interface to provide first audio output to a first audio receiver;
      a first video capture device to capture at least one of first image data or first video data;
      a first audio capture device to capture first audio data;
      a first network interface;
      at least one first processor; and
      a first storage medium in communication with the at least one first processor;
   causing the one or more first image capture devices to capture an image or a video segment;
   causing the one or more first image capture devices to upload the captured image or video segment to a specified location over the network;
   creating a public uniform resource locator ("URL") addressing the uploaded image or video segment; and
   providing the public URL to the first user;
   wherein receiving user input comprises receiving user input from the first user from a second image capture device that is associated with a second user and not associated with the first user, wherein, when receiving the user input from the first user, both the first user and the one or more second image capture devices are located at a second customer premises associated with the second user, the second customer premises being different from the first customer premises;
   wherein the method further comprises:
      collecting presence information with the second image capture device that is associated with a second user and not associated with the first user, the second image capture device located at the second customer premises;
      detecting presence of the first user at the second customer premises, with the second image capture device that is associated with a second user and not associated with the first user, based at least in part on the presence information;
      identifying the first user, with a second computer, based at least in part on identifying information derived from at least a portion of the presence information;
      receiving, with the second image capture device, the user input from the first user;
      in response to identifying the first user, sending, with the second image capture device that is associated with a second user and not associated with the first user, the received user input to the one or more first image capture devices over the network for controlling the one or more first image capture devices.

2. The method of claim 1, wherein the first computer is one of the one or more image capture devices.

3. The method of claim 1, wherein the first storage medium has encoded thereon a set of instructions executable by the at least one first processor to control operation of the one or more first image capture devices, the set of instructions comprising:
   instructions for controlling the first video capture device to capture a captured video stream;
   instructions for controlling the first audio capture device to capture a captured audio stream;
   instructions for encoding the first captured video stream and the captured audio stream to produce a series of data packets; and
   instructions for transmitting the series of data packets on the first network interface for reception by a second image capture device separate from the one or more first image capture devices.

4. The method of claim 1, further comprising:
   displaying the uploaded image or video segment with the user interface.

5. The method of claim 1, wherein the second image capture device comprises:
   a second video input interface to receive second video input from a second local content source;
   a second audio input interface to receive second audio input from the second local content source;
   a second video output interface to provide second video output to a second video display device;
   a second audio output interface to provide second audio output to a second audio receiver;
   a second video capture device to capture at least one of second image data or second video data;
   a second audio capture device to capture second audio data;
   a second network interface;
   at least one second processor; and
   a second storage medium in communication with the at least one second processor;
   the method further comprising:
      providing, over the network, at least one of video data or image data captured by the first image capture device, to the second image capture device, for display to the user on the second video display device.

6. The method of claim 1, wherein identifying the first user comprises one or more of:
   analyzing, with the second computer, at least one of captured second image data or captured second video data, using facial recognition software;
   comparing, with the second computer, at least a portion of the captured second audio data with a voiceprint;

comparing, with the second computer, at least a portion of the captured second audio data with stored challenge/response information;

determining, with the second computer, whether a user device that is detected in proximity to the presence detection device is a device associated with the first user; or detecting a presence of a user device that is associated with the first user, based on at least one of detecting a Bluetooth connection of the user device, detecting that the user device is associated with a WiFi access point with which the presence detection device has associated, or communicating with the user device using near field communication ("NFC").

7. The method of claim 1, wherein the specified location is a cloud storage system.

8. The method of claim 7, wherein causing the one or more first image capture devices to upload the captured image or video segment comprises:

causing the one or more first image capture devices to upload the captured image or video segment directly to the cloud storage system without transmitting the captured image or video segment to the first computer or any other intermediary server; and storing the uploaded image or video segment in a location assigned to the one or more first image capture devices.

9. The method of claim 1, further comprising:
providing the master account with control over and access to the uploaded image or video segment.

10. The method of claim 9, wherein providing the master account with control over and access to the uploaded image or video segment comprises receiving user input to share the uploaded image or video segment.

11. The method of claim 1, wherein controlling the one or more first image capture devices comprises:
configuring a behavior of the one or more first image capture devices.

12. The method of claim 11, wherein configuring a behavior of the one or more first image capture devices comprises:
changing an operating parameter of the one or more first image capture devices.

13. The method of claim 12, wherein the operating parameter is selected from a group consisting of an address for each of the one or more first image capture devices, a nickname for each of the one or more first image capture devices, and an avatar image associated with each of the one or more first image capture devices.

14. The method of claim 1, wherein controlling the one or more first image capture devices comprises:
sending a command code to the one or more first image capture devices.

15. The method of claim 14, wherein the command code comprises at least one of a command code for instructing the one or more first image capture devices to perform a network test, or a command code that is part of a set of command codes shared between the one or more first image capture devices and the first computer.

16. The method of claim 15, further comprising:
modifying the set of command codes to include additional command codes; and
transmitting the modified set of command codes from the first computer to the one or more first image capture devices.

17. The method of claim 1, further comprising:
registering, with the first computer, a master account for the first user;
assigning, with the first computer, the one or more first image capture devices to the master account;
receiving, at the first computer and via the network, a request from the first user to remotely access the one or more first image capture devices;
authenticating the first user, at the first computer, using a set of credentials associated with the master account;
accessing the one or more first image capture devices from the first computer, over the network, after authenticating the first user;
providing a user interface, from the first computer, over the network, wherein the user input is associated with options presented by the user interface.

18. The method of claim 17, wherein assigning the one or more first image capture devices to the master account comprises:
receiving, at the first computer, a communication from the one or more first image capture devices during an initial configuration of the one or more first image capture devices;
identifying, with the first computer, the one or more first image capture devices based on the communication; and
associating, at the first computer, the identified one or more first image capture devices with the master account.

19. The method of claim 17, wherein the network is the Internet, and wherein the user interface comprises a web page.

20. The method of claim 1, wherein controlling the one or more first image capture devices further comprises:
causing the one or more first image capture devices to capture and upload a plurality of images or video segments.

21. The method of claim 20, further comprising:
receiving, at the first computer, each of the plurality of images or video segments; and
refreshing the user interface to display each of the plurality of images or video segments as they are received.

22. The method of claim 20, wherein causing the one or more first image capture devices to capture and upload a plurality of images or video segments comprises causing the one or more first image capture devices to capture an image periodically on a specified interval.

23. The method of claim 22, further comprising:
creating, at the first computer, a time-lapse video from the plurality of captured images.

24. A first apparatus located at a first customer premises associated with a first user, comprising:
a video input interface to receive video input from a local content source;
an audio input interface to receive audio input from the local content source;
a video output interface to provide video output to a video display device;
an audio output interface to provide audio output to an audio receiver;
a video capture device to capture at least one of image data or video data;
an audio capture device to capture audio data;
a network interface;
at least one processor; and
a storage medium in communication with the at least one processor, the storage medium having encoded thereon a set of instructions executable by the at least one processor to perform one or more operations, the set of instructions comprising:
instructions for receiving, from a computer over a network, control instructions based on user input from the first user, wherein the control instructions are originally sent, via the computer, from a second apparatus that is associated with a second user and not associated with the first user, wherein, when receiving the user input from the first user, both the first user and the second apparatus are located at a second customer premises associated with the second user, the second customer premises being different from the first customer premises, the second apparatus having collected presence information, detected presence of the first user at the second customer premises based at least in part on the collected presence information, identified the first user, and, in response to identifying the first user, sent received user input from the first user located at the second customer premises to the first apparatus located at the first customer premises, via the computer and over the network, to control the first apparatus;
 instructions for controlling the first apparatus, based at least in part on the control instructions received from the second apparatus, via the computer over the network;
 instructions for causing the first apparatus to capture an image or a video segment;
 instructions for causing the first apparatus to upload the captured image or video segment to a specified location over the network;
 instructions for creating a public uniform resource locator ("URL") addressing the uploaded image or video segment;
 instructions for providing the public URL to the first user.

25. A system, comprising:
a first image capture device associated with a first user, the first image capture device being located at a first customer premises associated with the first user, the first image capture device comprising:
 a first video input interface to receive video input from a first local content source;
 a first audio input interface to receive audio input from the first local content source;
 a first video output interface to provide video output to a first video display device;
 a first audio output interface to provide audio output to a first audio receiver;
 a first video capture device to capture at least one of image data or video data;
 a first audio capture device to capture audio data;
 a first network interface;
 at least one first processor; and
 a first storage medium in communication with the at least one first processor, the first storage medium having encoded thereon a first set of instructions executable by the at least one first processor to perform one or more operations;
a second image capture device that is associated with a second user and not associated with the first user, the second image capture device being located at a second customer premises associated with the second user, the second image capture device comprising:
 a second video input interface to receive video input from a second local content source;
 a second audio input interface to receive audio input from the second local content source;
 a second video output interface to provide video output to a second video display device;
 a second audio output interface to provide audio output to a second audio receiver;
 a second video capture device to capture at least one of image data or video data;
 a second audio capture device to capture audio data;
 a second network interface;
 at least one second processor; and
 a second storage medium in communication with the at least one processor, the second storage medium having encoded thereon a second set of instructions executable by the at least one second processor to perform one or more operations; and
a computer, comprising:
 one or more processors; and
 a computer readable medium in communication with the one or more processors, the computer readable medium having encoded thereon a third set of instructions executable by the one or more processors to perform one or more operations, the third set of instructions comprising:
  instructions for receiving user input from a first user over a network from the second image capture device that is associated with a second user and not associated with the first user;
  instructions for controlling a first image capture device over the network, based on the user input received from the first user from the second image capture device; and
the second set of instructions comprising:
 instructions for collecting presence information;
 instructions for detecting presence of the first user at the second customer premises, based at least in part on the presence information;
 instructions for receiving the user input from the first user, when the first user is located at the second customer premises;
 instructions for, in response to identifying the first user at the second customer premises, sending the received user input to the first image capture device over the network for controlling the first image capture device that is located at the first customer premises;
the first set of instructions comprising:
 instructions for receiving, from the computer over the network, control instructions based on user input from the first user;
 instructions for controlling the first image capture device, based at least in part on the control instructions received from the second image capture device that is associated with a second user and not associated with the first user, via the computer over the network;
wherein instructions for controlling the image capture device, from the second image capture device that is associated with a second user and not associated with the first user, comprise:
 instructions for causing the first image capture device to capture an image or a video segment;
 instructions for causing the first image capture device to upload the captured image or video segment to a specified location over the network;
 instructions for creating a public uniform resource locator ("URL") addressing the uploaded image or video segment; and
 instructions for providing the public URL to the first user.

26. A first image capture device configured to be accessed over a network, the first image capture devices being located at a first customer premises associated with a first user, the first image capture device comprising:
    at least one processor; and
    a storage medium in communication with the at least one processor, the storage medium having encoded thereon a set of instructions executable by the at least one processor to perform one or more operations, the set of instructions comprising:
        instructions for receiving, over a network, control instructions from a computer to capture at least one of video data or image data of the first user, based on the detected presence of the first user, wherein the control instructions are originally sent, via the computer, from a second image capture device that is associated with a second user and not associated with the first user, wherein, when receiving the user input from the first user, both the first user and the second image capture device are located at a second customer premises associated with the second user, the second customer premises being different from the first customer premises, the second image capture device having collected presence information, detected presence of the first user at the second customer premises based at least in part on the collected presence information, identified the first user, and, in response to identifying the first user, sent received user input from the first user at the second customer premises to the first image capture device located at the first customer premises, via the computer and over the network, to control the first image capture device; and
        instructions for controlling the first image capture device, based at least in part on the control instructions received from the second image capture device, via the computer over the network;
    wherein instructions for controlling the first image capture device, from the second image capture device that is associated with a second user and not associated with the first user, comprise:
        instructions for causing the first image capture device to capture an image or a video segment;
        instructions for causing the first image capture device to upload the captured image or video segment to a specified location over the network;
        instructions for creating a public uniform resource locator ("URL") addressing the uploaded image or video segment; and
        instructions for providing the public URL to the first user.

* * * * *